(12) United States Patent
Chakraborty et al.

(10) Patent No.: US 12,024,201 B2
(45) Date of Patent: Jul. 2, 2024

(54) SMART INFRASTRUCTURES AND FIRST-RESPONDER NETWORK FOR SECURITY AND SAFETY HAZARDS

(71) Applicant: University of Florida Research Foundation, Inc., Gainesville, FL (US)

(72) Inventors: Prabuddha Chakraborty, Gainesville, FL (US); Reiner Dizon, Gainesville, FL (US); Christopher Vega, Gainesville, FL (US); Joel B. Harley, Gainesville, FL (US); Sandip Ray, Gainesville, FL (US); Swarup Bhunia, Gainesville, FL (US); Patanjali Sristi Lakshmiprasanna Sriramakumara, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/392,376

(22) Filed: Aug. 3, 2021

(65) Prior Publication Data
US 2022/0041187 A1 Feb. 10, 2022

Related U.S. Application Data

(60) Provisional application No. 63/061,215, filed on Aug. 5, 2020.

(51) Int. Cl.
*B60W 60/00* (2020.01)
*G05D 1/00* (2024.01)

(52) U.S. Cl.
CPC ......... *B60W 60/0025* (2020.02); *G05D 1/101* (2013.01)

(58) Field of Classification Search
CPC . B60W 60/0025; G05D 1/101; G05D 1/0027; B64C 2201/12; B64C 2201/14; B64C 39/024
See application file for complete search history.

(56) References Cited

U.S. PATENT DOCUMENTS

| | | | |
|---|---|---|---|
| 9,849,981 B1 * | 12/2017 | Burgess | G05D 1/0094 |
| 10,467,891 B1 * | 11/2019 | Bart | B64C 39/024 |
| 10,643,444 B2 * | 5/2020 | Kim | H04L 67/12 |
| 10,777,051 B1 * | 9/2020 | Kumar | G08B 7/062 |
| 10,956,980 B1 * | 3/2021 | Flick | G08G 5/0069 |
| 11,049,404 B2 * | 6/2021 | Gorsica | G08G 5/0069 |
| 2017/0092109 A1 * | 3/2017 | Trundle | G08B 25/006 |
| 2018/0195868 A1 * | 7/2018 | Rezvani | G05D 1/0055 |

* cited by examiner

*Primary Examiner* — Aaron L Troost
(74) *Attorney, Agent, or Firm* — Thomas | Horstemeyer, LLP

(57) ABSTRACT

Disclosed are various embodiments related to coordinated monitoring and responding to an emergency situation at a building structure as a supplement to a traditional emergency response. In some embodiments, a system comprises a computing device that is configured to receive sensor data from a sensor network. The sensor network includes monitoring units that monitor various locations of an infrastructure. The computing device determines an occurrence of an emergency event at a location in the infrastructure using an anomaly detector model based at least in part on the sensor data. A hybrid mobile unit is instructed by the computing device to navigate to the location of the emergency event. The hybrid mobile unit is configured to provide mobile sensor data associated with the location to confirm the emergency event.

18 Claims, 18 Drawing Sheets

US 12,024,201 B2

SMART INFRASTRUCTURES AND FIRST-RESPONDER NETWORK FOR SECURITY AND SAFETY HAZARDS

CROSS REFERENCE TO RELATED APPLICATIONS

This application claims the benefit of U.S. Provisional Application No. 63/061,215, filed Aug. 5, 2020 and titled "Smart Infrastructures and First-Responder Network for Security and Safety Hazards," the entire contents of which is hereby incorporated herein by reference.

BACKGROUND

A vital factor in determining the efficiency of an emergency response during an armed robbery, fires, school shootings, or similar situations is the time it takes for first responders to arrive. On average, first responders take more than seven minutes to arrive at a location of an incident. Delayed response can cause these precarious situations to escalate, resulting in large-scale damage to both life and property. Thus, it is imperative to shorten this response time. The two factors that can influence the response time are the time it takes for the incident to get reported to the authorities and the time it takes for the authorities to take cognizance of the incident upon arriving at the scene.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
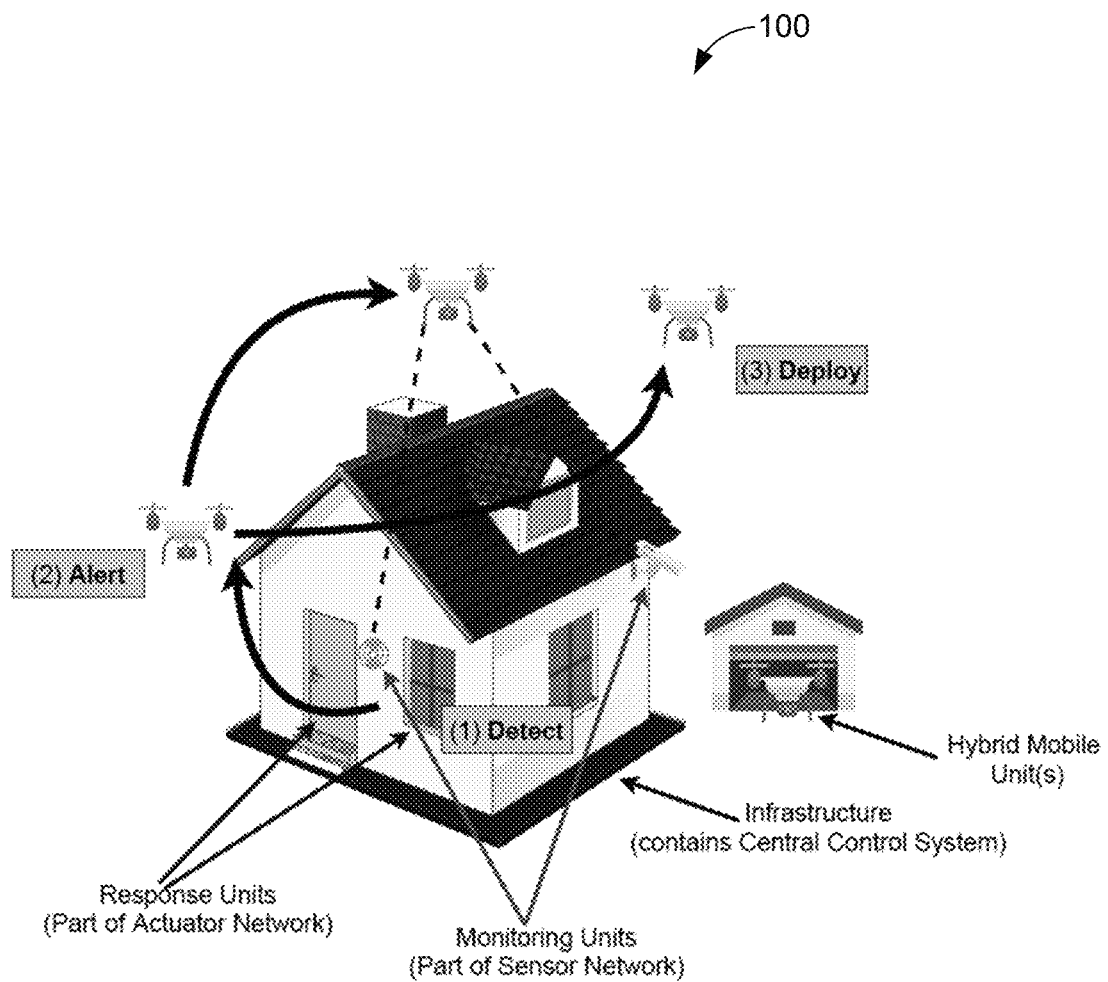
FIG. 1 is diagram of an emergency response system, according to one embodiment described herein.

This present disclosure relates to various embodiments for coordinated monitoring and responding to an emergency situation involving a structural complex as a way to supplement a traditional emergency response. This technology uses a series of monitoring units, such as environmental sensors, for an anomaly detection scheme which creates a model of the infrastructure's normal behavior that can be compared against a database of threats. In addition to these units, a fleet of response units can include an actuator and/or a fleet of first-responder entities which implement a crowd control protocol and a hierarchical staged response prescribed by a central control system.

This framework incorporates an infrastructure with a brain (e.g., a central control system) that enables the detection of emergency situations. The infrastructure can house both the central control system and, if available, first responder entities. Emergency situations include, but are not limited to, fires and criminal activities. The central control system handles the high-level decision making from collecting data to launching first-responder entities in a systematic manner called a staged response. In a staged response, the central control system can monitor the infrastructure for any suspicious events in and around it. When an event triggers a plurality of sensors, the central control system can launch one or more first-responder entities to the scene to confirm the threat. The central control system can coordinate monitoring units, response units, and hybrid mobile units to make decisions that mitigate and communicate the threat to the appropriate agencies. These units can also make autonomous decisions in the absence of the CCS based on the concept of self-organizing behavior using device-to-device (D2D) technology. The hybrid mobile unit can be equipped with several sensors, including but not limited to sound sensors, cameras, short range radar and LIDAR (Light Detection and Ranging). The sensor and actuator networks can collect data from the environmental sensors and control doors, windows, and other actuators within the infrastructure based on commands from the central control system, respectively. A specific incarnation of this framework can include an array of sensors that collectively monitor diverse situations and provide collective intelligence to respond to these situations appropriately, e.g., closing/opening doors/windows. These autonomous entities can detect safety issues and violations such as fire events and criminal activities like an active shooter and theft. They can respond according to a set of distributed intelligent algorithms.

A vital factor in determining the efficiency of an emergency response during an armed robbery, fires, school shootings, or similar situations is the time it takes for the first responders to arrive. On average, first responders take more than seven minutes. A delayed response can cause these precarious situations to escalate, resulting in large-scale damage to both life and property. Thus, it is imperative to shorten this response time. The two main factors that influence the response time are a) the time it takes for the incident to get reported to the authorities, and b) the time it takes for the authorities to take cognizance of the incident upon arriving at the scene. The various embodiments improve the response time by coordinating the response efforts using a hierarchical staged response and self-organizing behavior. The various embodiments include the following framework: an automated system that monitors an infrastructure for anomalous activities, responds to them in a systematic and autonomous fashion, contacts the authorities when there is a threat, and helps them navigate the scene upon arrival; thereby, enabling a quick response for emergency situations.

In some embodiments, an emergency response system can include 1) a multi-modal sensor network (made up of monitoring units), 2) a multi-modal actuator network (made up of response units), 3) a fleet of first responder entities or hybrid mobile units like UAVs and robots, and 4) a base station for the smart infrastructure. An infrastructure in the present disclosure can refer to a property that can be monitored and a location where the first responder entities would need to respond to, in the case of an emergency. These components can be contained within the premises of the infrastructure which can be referred to as a "smart" infrastructure that monitors for anomalous activities and responds to an initial threat with containment, evacuation, or locking in the occupants. The first three components can perform the monitoring and response tasks of various embodiments of the present disclosure. The central control system can constitute a central command framework, which makes the high-level decisions for situation monitoring and emergency response.

The embodiments of the present disclosure relate to an improved approach for coordinated monitoring of an emergency event and a coordinated response to the emergency event, which may occur at a commercial or residential structure. The embodiments provide several advantages over the existing designs. The embodiments include a system that includes a combination of components that is an improvement over existing systems in the field. For example, the embodiments can first include a smart sensor and actuator network implemented on pieces of infrastructure, such as buildings and vehicles. The smart sensor and actuator network can be configured to talk to a central control system (CCS) to communicate their data and to control actuators based on its commands, respectively, in response to a threat.

The smart sensor and actuator network can also include monitoring and response units. The monitoring and response units can be set up to communicate to nearby units using device-to-device (D2D) technology which can make their own decision in the absence of the CCS. Additionally, the smart sensor and actuator network can also include a fleet of first-responder entities or hybrid mobile units comprised of entities, such as unmanned aerial vehicles (UAVs) and robots, that perform a confirmation of the threat, initial containment of the situation, and communication with first-responders, other entities, and other sensors. Further, various embodiments of the system can include a central control system which monitors and responds to threats to the occupants of the infrastructure, as well as, augments the knowledge of emergency personnel before and during a threat.

In addition, the embodiments are directed to an improved system and method of monitoring and responding to emergency events, such as fires and criminal activities, in and around an infrastructure. The embodiments can use a hierarchical staged response implemented on the central control system along with monitoring, response, and, if available, hybrid mobile units. For example, a method of the embodiments can involve receiving sensor data and status signals from the sensor network at a given periodicity to minimize bandwidth and power. Then mapping the sensor data and status signals to a graph database of the infrastructure and all the sensors and actuators. The method can also include determining an emergency situation using an anomaly detector model and algorithm based on the plurality of environmental sensors which use either a threshold based algorithm or an object detection.

Then, the system and method can involve initializing a crowd control (civil order) protocol to direct traffic for occupants to maximize their safety as they evacuate or lockdown. Next, the system and method can deploy hybrid mobile units to the scene of the threat for confirmation according to a response unit scheduling algorithm. Then, the system and method can notify the appropriate emergency services or authorities about information pertaining to the threat.

Further, the system and method can involve having the hybrid mobile units perform severe actions whenever the situation worsens as first-responders begin to arrive onto the scene. Then, the system and method can involve communicating with first-responders about the severity of the threat as they mitigate it.

In some embodiments, the system and method can be implemented on the first-responder entity network, which activates whenever the central control system is in serious imminent danger due to the threat without needing to communicate with the central control system. In these embodiments, the system and method can incorporate an effective message passing algorithm using device-to-device communication to notify nearby units of the threat. Further, the system and method can continue and allow for communication with first-responders in the absence of the CCS by transmitting information to other communication nodes in the infrastructure or onto neighboring infrastructure.

Additionally, a networked environment for the embodiments can be configured for operation of the systems. For example, the infrastructure can have access to the Internet which allows the sensors and actuators to connect to the central control system. The infrastructure may have a space for the first-responder entities, which may be an allocated space inside or around the perimeter of the infrastructure where their locations can become known to the central control system.

Further, the networked environment may include first-responder entities with the ability to communicate with one another wirelessly. The first-responder entities can communicate with the central control system wirelessly. The central control system can have a three dimensional (3D) map of the infrastructure and its immediate surroundings, especially in the case where the first-responder entities are around the infrastructure. The monitoring and response units inside the infrastructure can connect to other units wirelessly (using Wi-Fi direct or Bluetooth beacon) or through a wired connection to communicate with one another using a device-to-device (D2D) communication scheme.

With reference to FIG. 1, shown is an exemplary architecture of an emergency response system 100, according to one embodiment described herein. The present disclosure refers to a smart infrastructure which monitors for threats or anomalous activities and a first responder network which reacts to that threat automatically and coordinates with actual first responders. FIG. 1 highlights the general architecture of the emergency response system 100.

The framework of the emergency response system 100 can include monitoring, response, and hybrid (performs both monitor and response) mobile units that are incorporated within an existing infrastructure. The embodiments of the present disclosure improve upon monitoring for threats, such as fire or criminal activities, with an anomaly detector model, which is a model of the normal operation of the infrastructure. Moreover, the framework of the emergency response system 100 can use these components to quickly respond to a threat with the coordinated efforts of the response units with the guidance of a centralized system, as well as autonomously using self-organizing behavior and device-to-device (D2D) communication.

Monitoring units include sensors that can incorporate four of the five human senses: sight, audio, touch, and smell. For example, the sensors can include a camera, an auditory sensor, a gas sensor, a pressure sensor, and other suitable environment sensors. These sensors can help the framework to detect normal activities within the infrastructure, as well as the anomalous patterns that can constitute a threat to the occupants of the infrastructure.

On the other hand, the response units can include actuators, speakers, and displays to warn and navigate the occupants during a threat. They also include fire retardants and water sprinklers in effect to mitigate the situation initially based on the patterns detected using the monitoring units. To confirm any given threat, the framework can deploy hybrid mobile units, such as robots and unmanned aerial vehicles, that can both monitor the situation and mitigate the threat simultaneously while in the air. At the heart of this framework for emergency response system 100 is a central control system (CCS) which can perform continuous anomaly detection, communicate with the appropriate authorities whenever a crisis occurs, and command the response units using a hierarchical staged response. The response units can include a processor, an actuating component, a communication transceiver (e.g., WiFi, Bluetooth, Zigbee, Z-wave, etc.t), sensors, and other suitable components. The response unit can execute various functionality (see e.g., FIGS. 5 and 7).

As illustrated in FIG. 1, the emergency response system 100 can involve (1) detecting of an emergency event from monitoring units, which are part of the sensor network; (2) alerting the infrastructure, which includes the central control system; and (3) deploying the response units, which are hybrid mobile units, that are part of the actuator network.

Next, a description of the monitoring units and the multi-model sensor network is provided. The monitoring unit, or sensor network, consists of multi-modal sensors that mimic four of the five human senses: touch, vision, hearing, and smell. Touch sensors include pressure sensors, motion sensors, or metal-infused walls that can detect electromagnetic emissions from living beings located in and around the infrastructure. Vision sensors, composed of cameras (normal, thermal, etc.) that provide visual reference of the infrastructure, that can detect unusual persons or unusual events. Auditory sensors can include microphone, and ultrasonic sensors for hearing unusual sounds such as gunfire, breaking glass, etc. Olfactory sensors include gas concentration sensors, and smoke detectors to determine when levels of combustible gases are observed before flames and visible smoke appear. These sensors are comprised of existing security systems, IoT devices, or other sensory systems.

The proposed framework provides the means to process and communicate information effectively during a threat. Information from these sensors can be sent to a central control system (CCS) as well as neighboring monitoring, response, and hybrid mobile units. They can use a device-to-device (D2D) communication scheme with existing protocols, such as Wi-Fi Direct or Bluetooth beacon. Should the CCS become unavailable during the threat, this D2D communication scheme allows other units to access the monitoring units' data. In addition to this scheme, the CCS can use these data to create a model of normal operation within the infrastructure in anticipation of any threats. The proposed framework improves upon the data fusion and communication from these monitoring units, helping the system make decisions appropriately from them. The monitoring unit can execute various functionality (see e.g., FIG. 7).

Next, a description of the response units and the multi-model actuator network is provided. The response unit, or the actuator network, receives information from the other units and the central control system and reacts to an imminent threat appropriately. The response framework can include two simultaneous or near simultaneous actions: 1) crowd control and 2) initial containment. Actuators on doors/windows, speakers, displays, and other warning systems constitute hardware needed for crowd control. Based on the received information, the actuators can initiate opening or locking protocols in a staggered manner. Just like the monitoring unit, the response units can also use D2D technology to communicate with nearby units to determine when it is appropriate to initiate their own crowd control protocol. This reduces the chances of stampedes or injuries on the infrastructure's occupants when a crisis occurs. The framework can intelligently determine which parts of the infrastructure require the initial containment to help with the issue of poor allocation of containment resources, as well as to help with crowd control. This mitigation protocol uses fire retardants, water sprinklers, and other resources. The actuator network is responsible for crowd control and threat mitigation, which is a responsibility shared by the hybrid mobile units in the next paragraph.

Next, a description of the hybrid mobile units and the first-responder entities is provided. The primary first-responder entities for security and safety hazards are the hybrid mobile units. Examples of these include robots and unmanned aerial vehicles garaged within or around the periphery of the infrastructure. These mobile units connect amongst each other and the neighboring units, as well as with the central control system. This configuration allows for the deployment of hive-mind intelligence. These entities can have an intelligent control unit and can also follow certain instructions from the CCS. Every safety situation differs from the perspective of each first-responder entity, and their position, type and other parameters can also determine their role in the team. So, it is prudent to allow the first-responder entities to have a certain level of independence from the CCS. The entities can coordinate among themselves to contain the safety concerns. To avoid false alarms, these entities can act in a gradually increasing level of alertness to deal with the suspected safety concern. Once they can easily confirm certain scenarios, such as building fires, the alertness level of all of the first-responder entities can very quickly move to deal with the concern. In the case of a potential intruder, the first-responder entities will not directly engage with the intruder at first, but deal with the situation initially using non-physical actions, as well as gather information about the scenario. Non-physical actions could include alarms and alerting the appropriate authorities. If the first-responder entities are certain the suspected intruders are a threat, then only appropriate actions can be taken. Once the first-responder entities collectively confirm the severity of the situation, they can act accordingly as a team based on their intelligent control unit.

Next, a description of the central control system is provided. The command central for this framework is a central control system (CCS) which makes all the high-level decisions in regard to handling a threat. This system can exist inside the infrastructure or can run on the Internet as a cloud application. It can receive sensor data from the monitoring units, status signals from the response units, and all relevant information from the hybrid mobile units while in flight. These units can communicate using wired or wireless connection to the CCS whether it exists locally or in the cloud. As it receives sensor data, it can perform data fusion and create/train a model that observes the normal operation of the infrastructure. The objective is to use history of known activities and unusual activities at the current instance detected by the monitoring unit to strengthen an anomaly or threat detection algorithm. With this algorithm, the CCS can assess the current state and compare it against its knowledge of certain situations which can be continually updated from original specification. If the current state triggers one of the known situations, it can decide to raise the awareness level and deploy the appropriate response or hybrid mobile units at that time. The CCS employs a centralized response unit scheduling scheme to deploy the right number of units at any given instance for these locations. In addition, the CCS can also communicate with human first-responders at every stage of the response, from notifying the initial threat, to alerting the responders about the status of the threat as they arrive at the scene to better prepare them for the situation. Therefore, the CCS can continue to monitor the situation and adjust the awareness level. Once the situation has been resolved, the emergency response system can return to its normal state and can command deployed actuators to return to their original position.

Next, a description of the emergency response system 100 is provided. The emergency response system 100 can comprise of a sensor system, a network of actuators, a cluster of autonomous entities or hybrid mobile units, a central control system, and other suitable components. The sensor system can also include monitoring units in and around the infrastructure which comprises a network of sensors that can act similarly to four of the five human senses. There can be four sensory modes: smell, video, audio, and touch. The sensor can include smoke/flame sensors, cameras, microphones, and touch/pressure sensors. A group of these sensors can connect to a local microprocessor to log their data and process their data according to the appropriate units and signals for the CCS. As processing video and audio signals can be intensive on local microprocessors, it can be streamed to the CCS and can be processed there with a faster processor.

These sensors can connect through a wired connection or wirelessly transmit (via Wi-Fi, Radio, Bluetooth, etc.) their data to the CCS and to neighboring monitoring and response units, especially when the CCS becomes unavailable. The network of actuators (called response units) inside the infrastructure handles crowd control and automatically responds to the threat depending on the severity of a situation determined by the CCS using information from the monitoring and hybrid mobile units. The doors and windows of an infrastructure can be automated (if not already so) using motors and their corresponding motor controllers that can connect using a wired connection or wirelessly (via Wi-Fi, Radio, Bluetooth, etc.) to the CCS to receive commands from and status of the infrastructure. These motor drivers must take open/close instructions from the CCS at the right time when the situation has been assessed as part of the staged response.

Other warning systems include speakers and displays which help warn occupants of the infrastructure, that a threat is ongoing and lets them know of the evacuation or lockdown procedures to aid with crowd control. Also, fire retardants, water sprinklers, and other mitigation resources are deployed in a controlled manner as to reduce wastage and to not become a hindrance to the crowd control procedures. These response units can communicate their statuses (e.g. open/close state, power levels, resources available) to the CCS and to neighboring monitoring and response units, especially when the CCS becomes unavailable.

Figure 2:
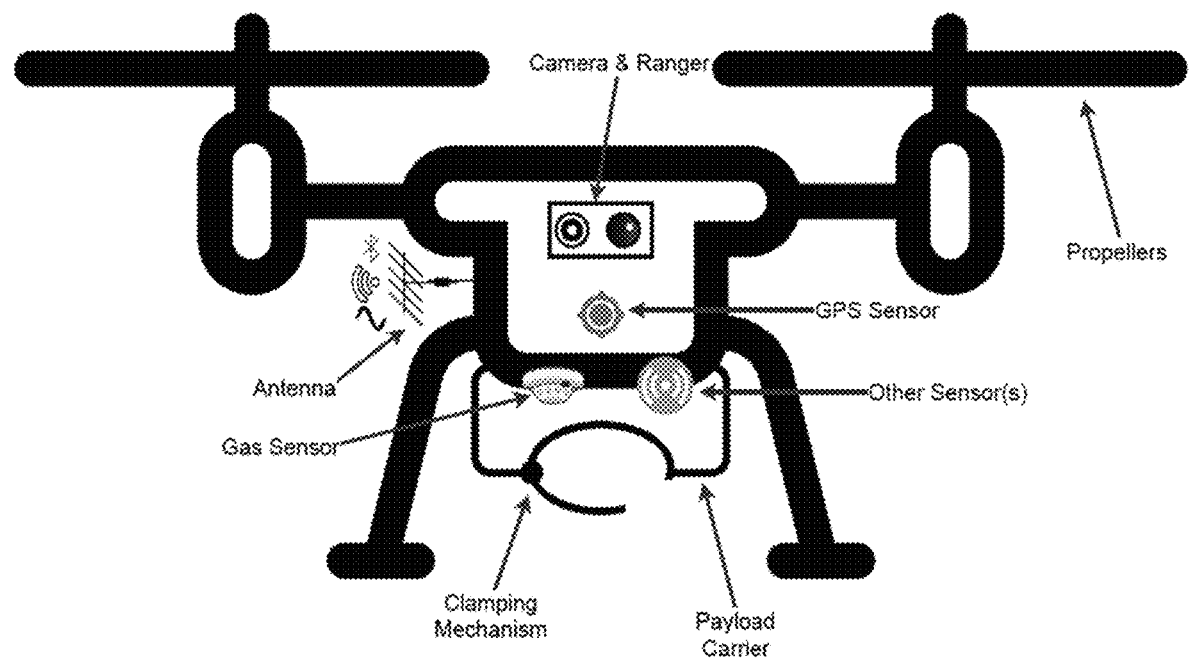
FIG. 2 is drawing of a hybrid mobile unit, according to one embodiment described herein.

Next, with reference to FIG. 2, shown is an exemplary drawing of a hybrid mobile unit. The cluster of autonomous entities or hybrid mobile units, such as UAVs and robots can constitute the active first responder network. The cluster of hybrid mobile units are capable of communicating to the central control system (CCS) as well as communicating among themselves. These entities can include hardware modules as shown in FIG. 2. For example, these entities can include a navigational module, a communication module, onboard sensory module, a payload module, a control module (e.g., a controller or computing device), and other suitable components.

The navigational module can include a ranger sensor (light detection and ranging (LIDAR) sensor, ultrasonic, etc.), normal/thermal camera, and global positioning system (GPS)—to help the entity traverse the infrastructure effectively even in the presence of visual obstructions. Next, the communication module can include a radio antenna to connect the entity to other components using protocols, such as Bluetooth, Wi-Fi, Zigbee, and other suitable protocols.

The onboard sensors can include a gas sensor, a normal/thermal camera, a microphone, and other suitable sensors. The onboard sensors can be used to confirm a threat on-the-field when the CCS issues a check-in message to the entity.

The payload module can include a payload carrier, a clamping mechanism, a high torque motor for actuating the mechanism, which enables the entity to equip with tools to deal with a threat, such as flame retardants, and alert noise generators. Additionally, the control module can include a microcontroller with peripheral attachment points. The control modules can act as a command center for the entity which takes the input/output from all other modules. The control module can have an intelligent control software unit to make its own decisions and control itself (see e.g., FIG. 6).

In one embodiment, each entity can be constructed using a microcontroller board that has peripheral attachment points (either using existing parts or parts from scratch). The entity can be constructed by creating a payload carrier using metal or wood that is larger than the size of a flame retardant.

An adjustable clamping mechanism can be built. The adjustable clamping mechanism can include parts such as a screw-able clamp (e.g., hose clamp), a motor, mounts, and other suitable components. The motor can be attached in direct-drive with the screw of the clamp. The mounts can be welded or connected to the clamp such that it can be attached to the payload carrier.

Then, the adjustable clamping mechanism can be mounted to the payload carrier and the payload carrier can be mounted to the entity. Then, the microcontroller of the entity can be connected to the antenna, camera, ranger, other sensors, and clamp motor onto the peripheral attachment points of the microcontroller. Then, the microcontroller can be programmed with the software, as will be described. These entities can reside near the infrastructure (or the CCS) called the entity headquarters. In this headquarter, the entities and the tools for dealing with threats are stowed away.

The CCS can receive information from the infrastructure's sensors and monitor the infrastructure for potential threats, such as fire and criminal activity. This component can employ a hierarchical decision algorithm to respond and manage a threat. It can also issue coarsely grained instructions for the first-responder entities' actions. This component should be located locally within the infrastructure or as a cloud application. Additionally, the CCS comes with two algorithms based on where it is located which determines the level of autonomy of the first-responder entities.

First, the centralized algorithm will be described. The centralized algorithm is a default to the system where the CCS makes the high-level decisions in regard to the staged response for a given threat. Second, the cooperative entity algorithm activates whenever the CCS (especially implemented locally) is under imminent danger due to the threat at hand where the entities cooperate with each other to make a decision about the staged response.

Figure 3:
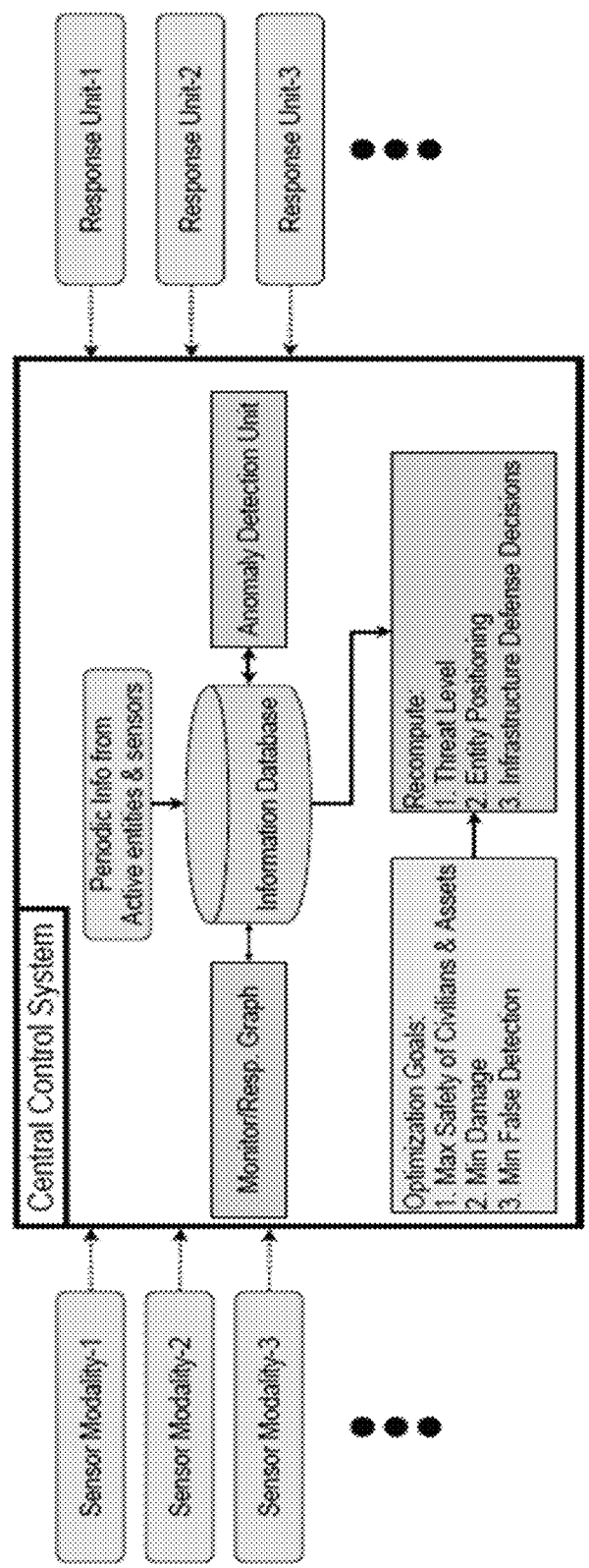
FIG. 3 is a block diagram of components of a central control system and flowchart of operations, according to one embodiment described herein.

With reference to FIG. 3, shown is a block diagram for the central control system (CCS) and an overview of the control and decision algorithm. A discussion of the anomaly detection and overview of the CCS is provided. The CCS can make the high-level decisions in monitoring the infrastructure and responding to a threat. Especially throughout normal operations, the CCS can continuously monitor the environmental sensors of the sensor network throughout the infrastructure. The information from this network becomes fused in order to create an anomaly/threat detection algorithm (e.g., an anomaly detection unit). This algorithm can use a model (e.g., an anomaly detector model) produced from the patterns of the occupants/infrastructure as a history-based model. As part of this algorithm, it can determine if it has perceived danger near the area where it is located using one of two techniques, among others. For example, a first technique can be threshold-based. For sensors using an Analog-to-Digital converter (ADC) like gas, flame, and pressure sensors, a threshold based on characteristics of the threat can set a baseline when such event begins or continues to occur.

Second, an unusual object/personal detection technique can be another option. For camera and audio sensors, machine learning classifier algorithms can be used to detect unusual objects or people based on a database of known people who are part of the building and known objects. These anomalies can also include smoke, flames, weapons, and the like.

The use of object detection or threshold-based detection algorithms gives insight into the current state of the infrastructure and a look into a potential future threat. In this fashion, the anomaly detection scheme can learn to anticipate threats and their severity before they escalate. Learning from the continuous monitoring of the sensors can reduce false alarms when minor occurrences happen.

Environmental sensors both in the infrastructure and the hybrid mobile units can transmit data to the CCS with a specified periodicity. The CCS can maintain a database of the monitoring, response, and hybrid mobile units of the infrastructure in a graph-like structure accounting for the infrastructure's 3D map.

The CCS can monitor any changes from the building sensors and assess them against knowledge of potential threats which are stored in a database. Once a threat is identified, it can initiate the entity scheduling algorithm to deploy hybrid mobile units and response units at the appropriate location.

The hybrid mobile units can aggregate their own sensor data and send a coarse-gained analysis of the situation to the CCS if it is still available. If any potential anomaly is detected, the hybrid mobile units can push it to the CCS for detailed processing.

The CCS can determine and confirm any potential threat based on the data received. They are also capable of detecting threats independently but can confer with other hybrid mobile units and the cloud before coming to a conclusion. The CCS can maintain a database of the hybrid mobile units' location, sensor data and other information. If any threat is detected, then the CCS can decide on the action to be taken based on certain optimization goals. Some non-limiting examples of optimization goals can include maximum safety of civilians and assets, minimize damage to the infrastructure, minimize false detection, and other suitable optimization goals. The optimization goals can have a hierarchy or an order of priority that is considered when determining the action to be taken.

In some embodiments, the CCS can determine a threat level based the data received from the various inputs (e.g., sensor network, response units, etc.). The CCS can then determine an entity positioning and infrastructure defense decisions. The infrastructure includes, but is not limited to, door/windows and sprinklers along with the hybrid mobile units which can act as a team to contain the situation. The cloud control system can also inform certain authorities based on specified protocols.

Figure 4:
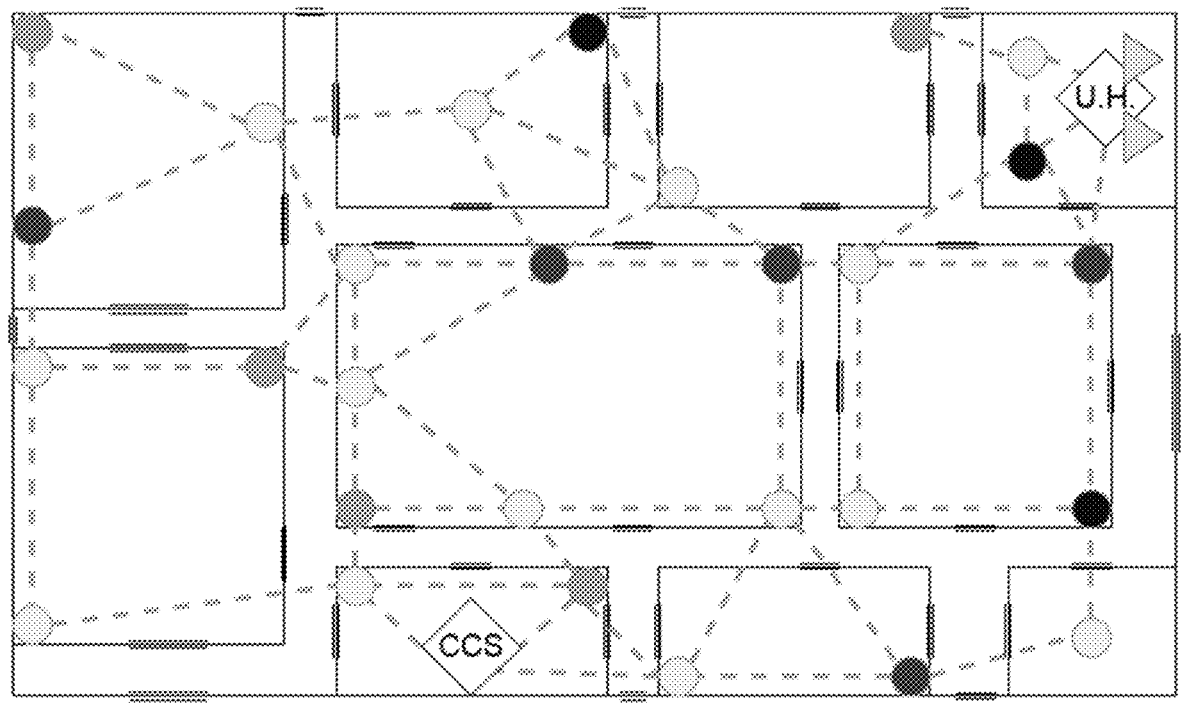
FIG. 4 is a drawing of a layout of the monitoring and response units overlaid on an infrastructure map, according to one embodiment described herein.

With reference to FIG. 4, shown is a layout of the monitoring and response units overlay on an infrastructure map. To keep track of the location and approximate neighbors of units communicating to the CCS, a graph data structure of the monitoring, response, and hybrid mobile units is created based on their location in the infrastructure. FIG. 4 is a visualization example of this graph database of the units overlaid with the infrastructure map with different sensor modalities as indicated by the different shades of blue. Initially, this graph can be constructed when all the units start their first communication to the CCS, and the CCS with the knowledge of the infrastructure can input the units and connect their neighbors in the graph. This initial graph can also help the anomaly detection scheme to build its initial model. During normal operation, when a new device is installed, the CCS can monitor this new change and update the graph appropriately, when given the location of the new device. This will give an opportunity for the anomaly detection to refine its model. The diamond symbol on the figure refers to any units that can communicate to neighboring infrastructures, such as the CCS or the UAV headquarters (if one exists). Ultimately, the CCS can include this information for keeping track of everything in the framework.

Figure 5:
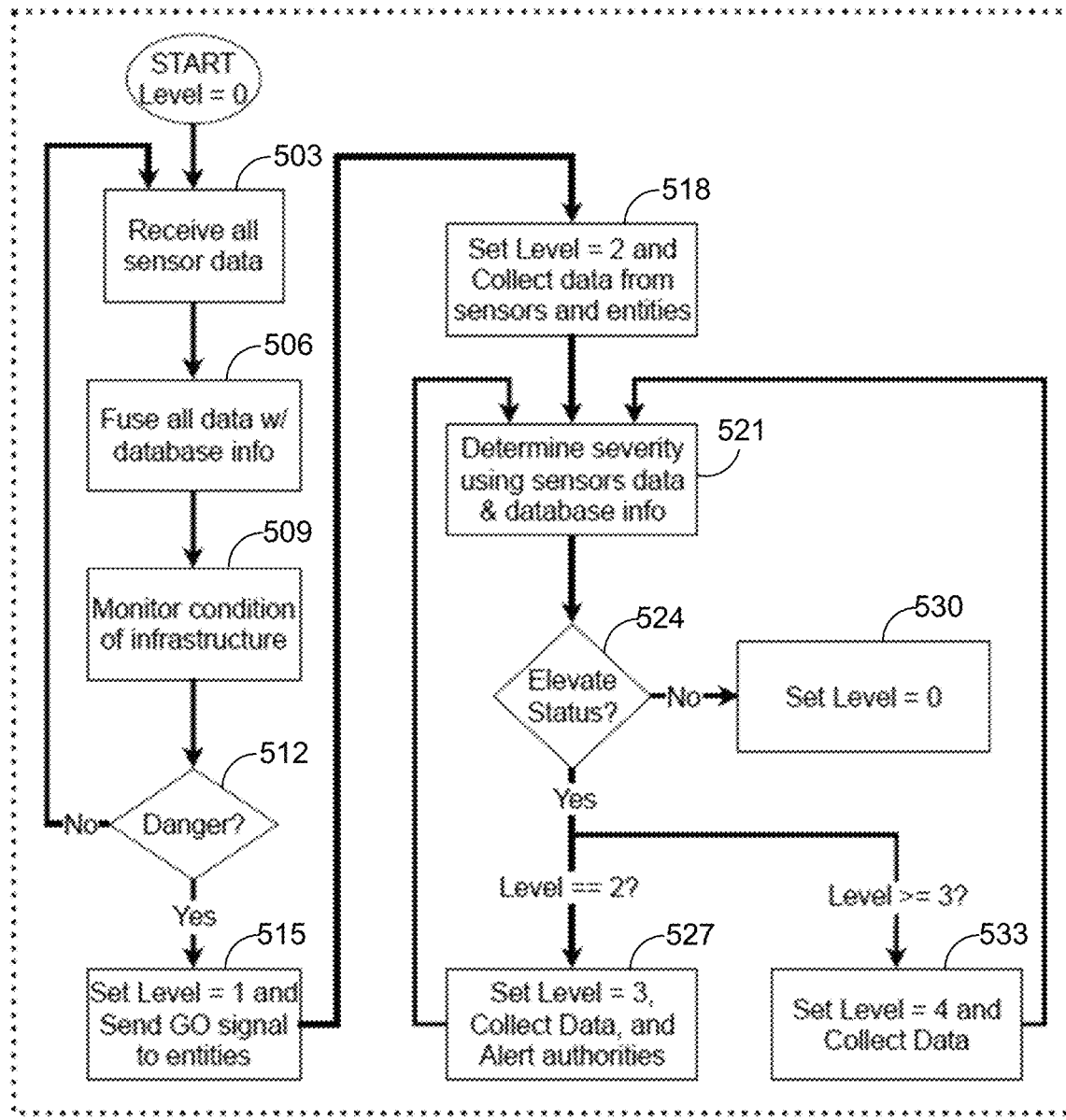
FIG. 5 is a flowchart of a response unit scheduling by the central control system, according to one embodiment described herein.

With reference to FIG. 5, shown is a flowchart of a response unit scheduling by the central control system (CCS) (FIG. 3). The scheduling scheme activates whenever a threat is observed by the anomaly detector unit (e.g., using an anomaly detector model). Based on the data from the monitoring units and the graph database, the CCS can follow the stages of response for a particular threat. These stages help coordinate appropriate response units to mobilize a systematic response to maximize safety of the occupants and the assets within the infrastructure. The responding units can receive high-level instructions from the CCS when it discovers a threat.

Next, a discussion of the stages of response are provided. First, the system can observe the monitoring units and detect for danger levels or anomalies from a plurality of them. The system can build patterns of normal operation via periodic monitoring for the anomaly detector unit. Then, the system can notify or acknowledge requests from the response units in phases depending on the severity and the type of threat. Then, the system can initialize the crowd control protocol and mobilize hybrid mobile units (if available) to the scene.

Subsequently, the system can attempt to contain a threat initially and alert the authorities after confirmation of the threat. Then, the system can allow hybrid mobile units to perform severe actions when necessary. FIG. 5 shows the CCS flowchart which performs all the high-level decision making for the system, particularly the response unit scheduling. The sensor network can send their processed sensor data to the CCS at a specified periodicity (step 503). As it receives these data, then the CCS fuses all these data along with the information from its database to detect the anomalies or threats with the goal of minimizing false alarms (step 506). The CCS can monitor the condition of the infrastructure using the information provided (step 509). Based on this information, the CCS can decide the danger level and type of threat (step 512). If there is no danger, then the CCS proceeds back to step 503. If the CCS determines that there is danger, then the CCS can proceed to step 515. At step 515, the CCS can issue a threat level 1 and dispatch one of the hybrid mobile units (e.g., send a "GO" signal to the hybrid mobile units) if available to the location of the threat, in which the hybrid mobile units can be used to confirm the threat and its location. At the same time, the actuators around the threat can begin its crowd control protocol (see next section). Once the initial fleet of hybrid mobile units have arrived at the scene, the threat level elevates to Level 2 (step 518), and the CCS can continue to assess the severity of the situation based on the monitoring units and the deployed hybrid mobile units (step 521). The CCS can determine whether to elevate the status of the threat (step 524). If most of them confirm the threat, the CCS can raise the threat level to Level 3 and alert the authorities with the type of threat and location (step 527). If the anomaly detector model does not deem the situation to be a substantial threat, the hybrid mobile units can return to the CCS, and the threat level resets back to zero (step 530). If the situation worsens after threat level 3, the CCS can elevate the status to level 4, allowing the hybrid mobile units to perform severe actions to mitigate the threat (step 533). Once the threat ceases, the threat level resets back to zero.

Figure 6:
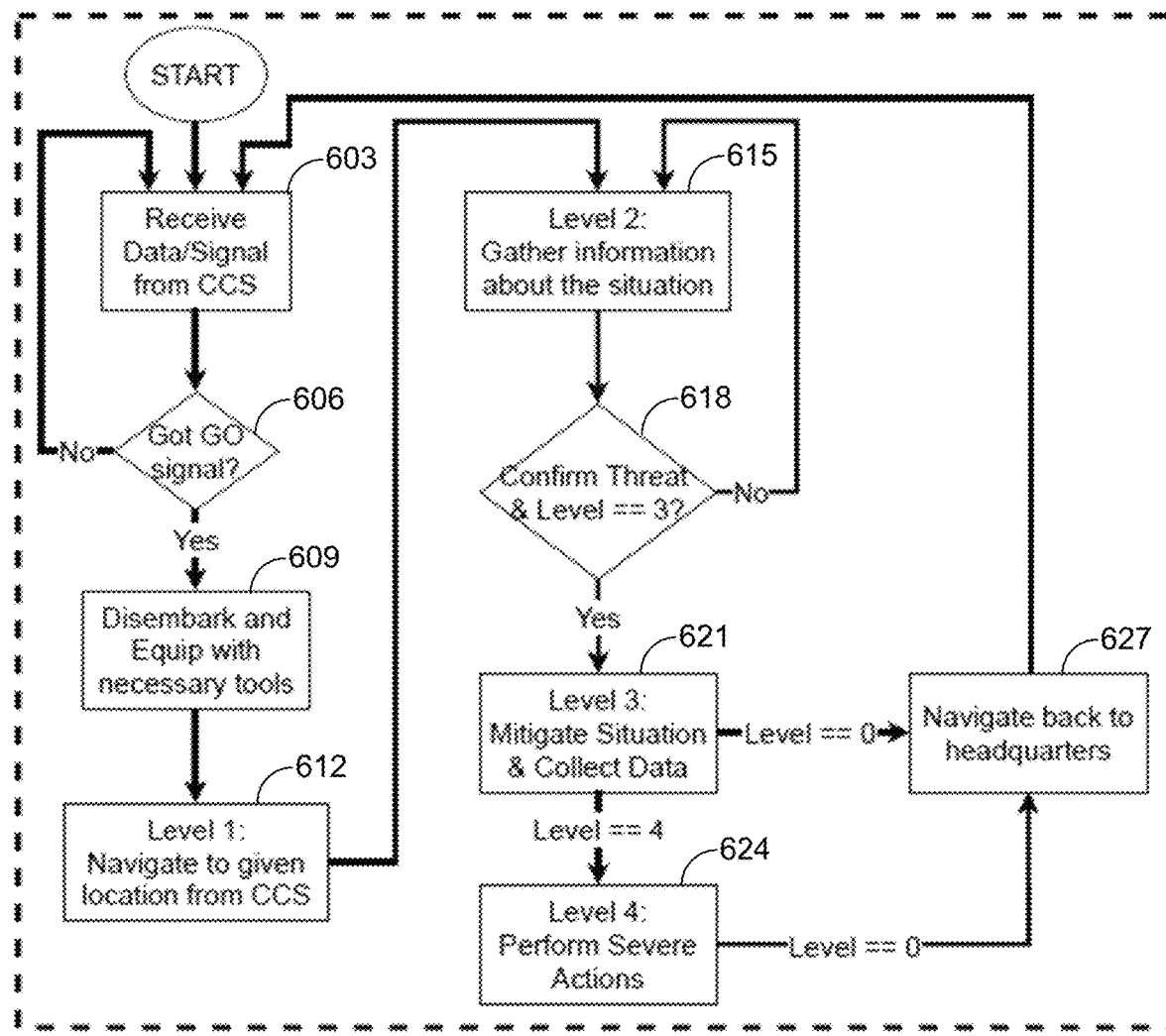
FIG. 6 is a flowchart of operations for a hybrid mobile unit, according to one embodiment described herein.

With reference to FIG. 6, shown is a flowchart for the hybrid mobile units. FIG. 6 outlines the control flow for the hybrid mobile units. If the CCS is still active, the hybrid mobile units can receive data from the CCS (step 603). For example, the hybrid mobile units can wait for the GO signal from the CCS (step 606). Afterwards, they can disembark from their location and equip themselves with the necessary tools, such as flame retardants, noise generators, or flashlights, based on the threat (step 609). At threat level 1, the hybrid mobile units can navigate to the given location using its navigational modules and self-contained path-planning algorithm (step 612). At step 615, the hybrid mobile units can gather information about the situation (step 615) using is onboard sensors. Afterwards, at threat level 2, the hybrid mobile units can attempt to confirm the threat using its onboard sensors and process the data using the same regimes as the environmental sensors (step 618). If the hybrid mobile unit fails to confirm the threat, the CCS proceeds to step 627 and instructs the hybrid mobile units to head back to headquarters.

If the CCS receives confirmation of the threat and raises to threat level 3 (step 621), the hybrid mobile units respond to mitigate the situation with the onboard equipment while continuing to collect and send data to the CCS. If the threat worsens at threat level 4, the hybrid mobile units can perform severe actions to mitigate the threat or save the occupants (step 624). For example, in case of a fire, the hybrid mobile unit can break windows or redirect traffic for occupants as they escape the infrastructure. In the case of criminal activities, the hybrid mobile unit can approach the suspect by flying very close or obstruct the suspect by colliding with the suspect. Once the threat ceases, the hybrid mobile units can return to their headquarters (step 627).

Figure 7:
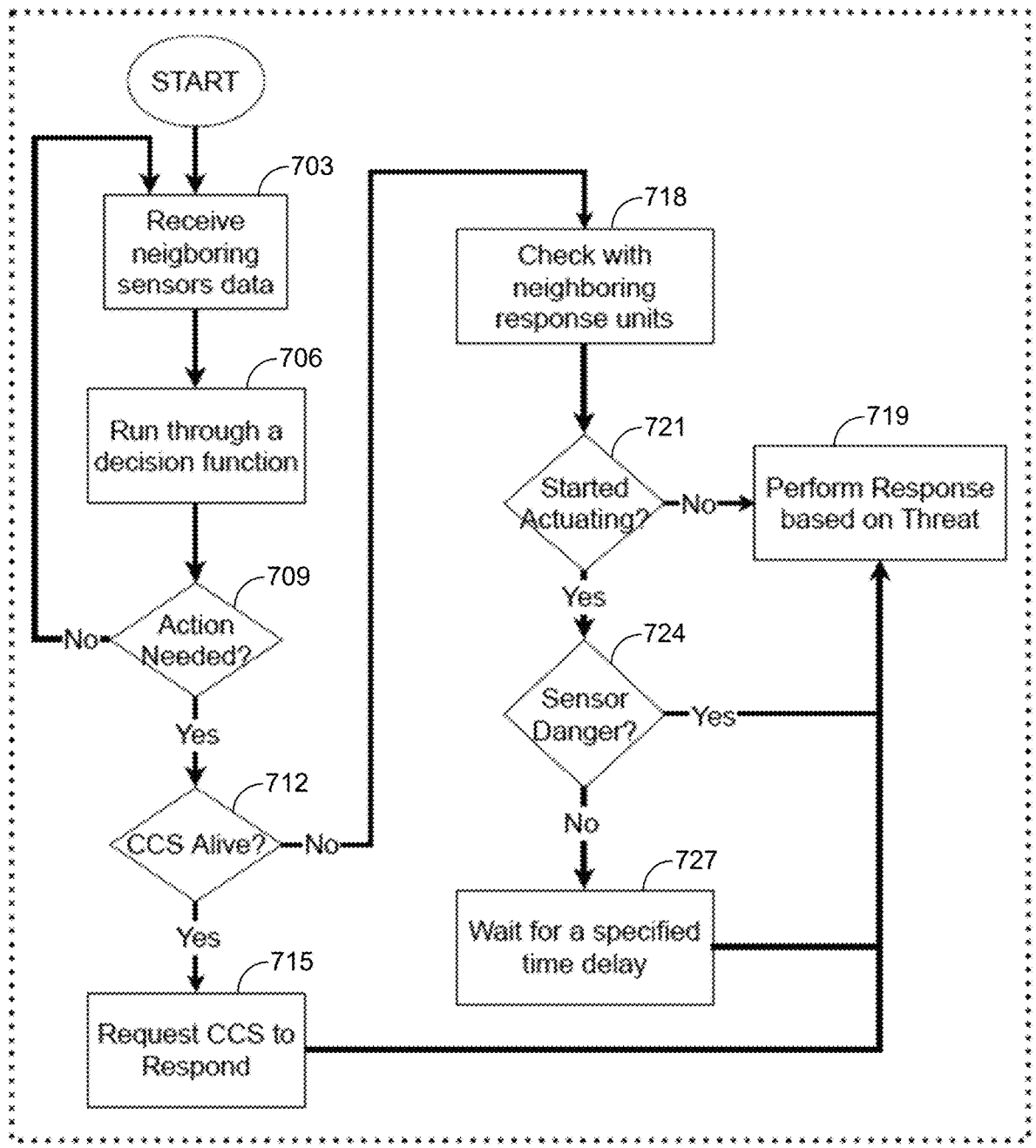
FIG. 7 is a flowchart for crowd control protocol for a response unit, according to one embodiment described herein.

With reference to FIG. 7, shown is a flowchart for a crowd control protocol. The crowd control protocol as shown in FIG. 7 can start with receiving neighboring sensor data (step 703) from nearby monitoring units and running through a decision function (step 706). An actuator response unit can initiate an action once nearby monitoring units or the CCS can indicate a threat from their data or fusion of them (step 709). At step 712, the response unit can determine whether the CCS is still alive. In a scenario where the CCS is still alive and active during the threat (step 715), the response unit actuator can send a request to the CCS whenever a plurality of neighboring monitoring units record dangerous levels. The neighboring monitoring units are defined as sensors in the same room or floor as the actuator in question. Depending on their distance or their power status, the crowd control protocol of the response unit can weigh these factors independently in deciding to initiate a request to the CCS. Once the CCS acknowledges and approves the request, the actuator can perform necessary actions to protect the occupants (step 719). For example, in the case of a fire, the actuator response unit can open and unlock doors and windows, verbally warn the room's occupants of the fire, and direct traffic away from the room using displays and speakers. In another example, in the case of criminal activities, the actuator response unit, can close and lock doors and windows, and use non-verbal means to communicate dangers to the occupants using the displays.

If the CCS or its Internet connection becomes unavailable (step 718), the actuator response unit can communicate and check with nearby actuator response units. The response unit can determine whether actuating has started (step 721). If actuating has not started, the actuator response unit can proceed to step 719 in order to perform a response based on the threat and the threat level. If actuating has started, the actuator response unit can determine if there is danger based on sensor data (step 724). If there is danger, the actuator response unit can proceed to step 719. If the actuator response unit initialized its protocol and there is no danger (step 727), it can wait to start its own until a time delay has been met based on the number of occupants of the other rooms, the sensor values in the room reaches dangerous levels, or some other suitable condition is met.

Figure 8:
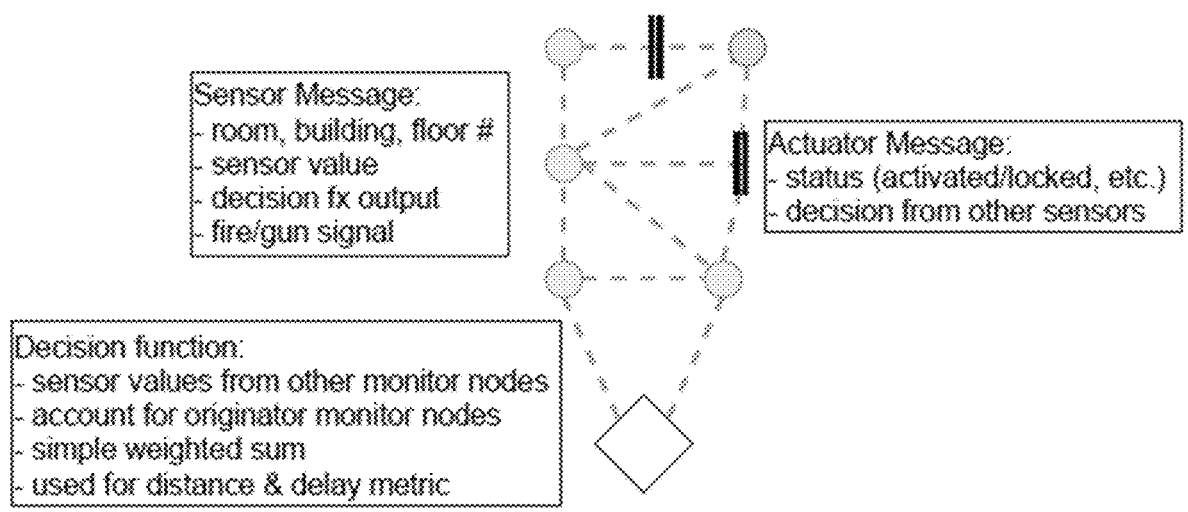
FIG. 8 is a diagram of a message passing scheme for a cooperative multi-unit algorithm, according to one embodiment described herein.

With reference to FIG. 8, shown is a diagram of a message passing scheme for a cooperative multi-unit algorithm. In this scheme, all the monitoring, response, and hybrid mobile units can have more autonomy in making decisions in handling a threat based on the concept of self-organizing behavior. This can require updating the software on all of the units to enable the use of device-to-device (D2D) technology, such as Wi-Fi Direct or Bluetooth Beacon. Part of this algorithm includes a message passing process as shown in FIG. 8 that sends the following information to nearby devices. The information being passed can include location information, sensor data, neighboring monitoring unit's information, and other suitable data.

The location information can refer to a building/floor/room (if detected a threat around it). The sensor data can refer to a power status if a threat is detected around it. The neighboring monitoring unit's information can be included if it senses danger.

This scheme can occur in conjunction with the response unit scheduling at the CCS. It provides the means for communication amongst these units, especially when the CCS becomes unavailable or the units become disconnected from the Internet. This scheme is necessary when the CCS is implemented locally in the infrastructure, although this scheme can still work for the CCS in the cloud.

Figure 9:
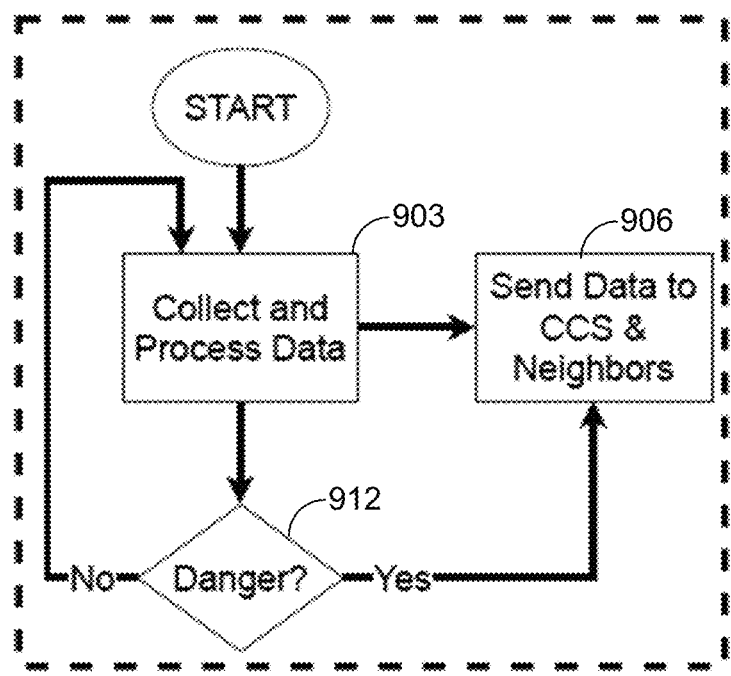
FIG. 9 is a flowchart for monitoring units in a cooperative multi-unit algorithm, according to one embodiment described herein.

Moving on to FIG. 9, shown is a flowchart for monitoring units in a cooperative algorithm. The sensors can now transmit processed sensor data and danger signals to both the central control system (CCS) and the hybrid mobile units as outlined as shown in FIG. 9. With this scheme, the components of the framework can make decisions on their own, even without the guidance of the CCS, which is similar to the concept of emergence from self-organizing systems. Response units, especially actuators, can make their own decision on whether to open or close depending on the sensor information from monitoring units in the same room when the CCS becomes available as described in the Crowd Control Protocol section.

For example, the monitoring units can collect and process data at step 903. In some embodiments, the monitoring units can send data to the CCS and neighboring units if they are available. Alternatively, the monitoring units can determine whether the is danger from the threat (912). If there is danger, the monitoring unit can proceed to step 906. If there is no danger, the monitoring unit can proceed to step 903.

Figure 10:
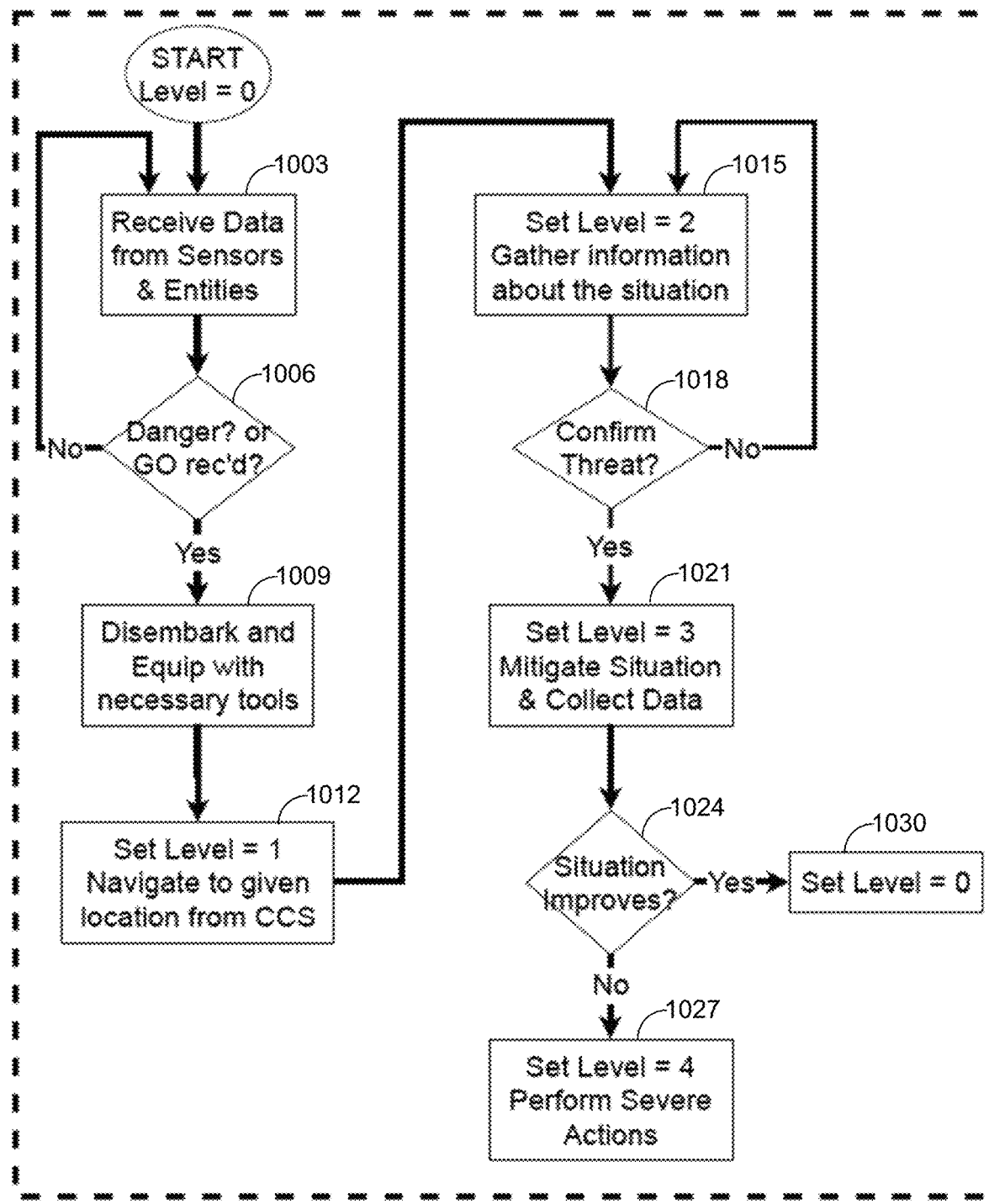
FIG. 10 is a flowchart for cooperative algorithm for a hybrid mobile unit, according to one embodiment described herein.

Next, with reference to FIG. 10, shown is a flowchart for cooperative algorithm for a hybrid mobile unit. FIG. 10 displays the control flowchart for the hybrid mobile units with some additional autonomous functionalities. In this cooperative hybrid mobile units' scheme, the hybrid mobile units can receive data and status signals from the sensor and actuator network, as well as other hybrid mobile units (step 1003). If the CCS decides there is a threat beforehand, the hybrid mobile units can also listen for the GO signal as well (step 1006), before taking action. Otherwise, the hybrid mobile units can decide if danger is detected from the network and can send out one of their own to confirm the threat (step 1009). If multiple hybrid mobile units with similar resources are notified of the danger, a unique unit that meets a certain criteria (e.g., lowest IP address) can go to the scene of the threat (step 1012) and gather information about the situation (step 1015). Based on the gathered information, the unit can confirm the threat (step 1018). If the threat is confirmed, the unit can set the threat level to 3 and mitigate the situation (step 1021). The unit can collect additional data on the situation and determine if the situation has improved (step 1024). If the situation improves, the unit can set the threat level to zero. If the situation does not improve, the unit can set the threat level to fourth and perform one or more severe actions (step 1027).

Figure 11:
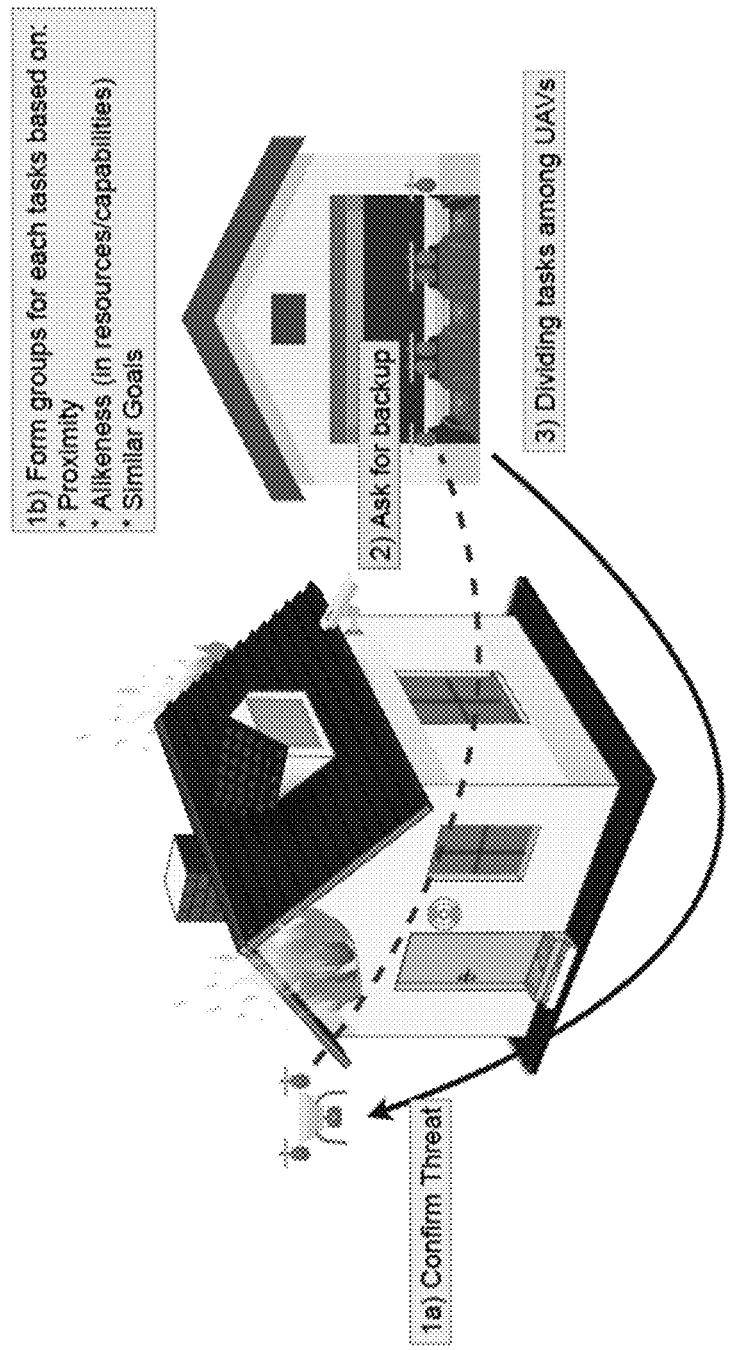
FIG. 11 is an illustration of hybrid mobile units at a beginning of a mission scenario, according to one embodiment described herein.

With reference to FIG. 11, shown is an illustration of hybrid mobile units at the beginning of a mission. As the singular hybrid mobile unit checks out the location, if the threat is deemed legitimate, this unit can send a "HELP" request signal to the other mobile units as shown in FIG. 11. At first, this deployed hybrid mobile unit can check if there are hybrid mobile units within its connection range using network discovery. Meanwhile, the remaining hybrid mobile units can begin forming groups amongst themselves by comparing against one or more conditions of a criteria. For example, the criteria can include a proximity (to each other or to the location of the task), an alikeness (similar resources, similar capabilities), similar goals (similar outputs of their decision algorithms), and other conditions.

Figure 12:
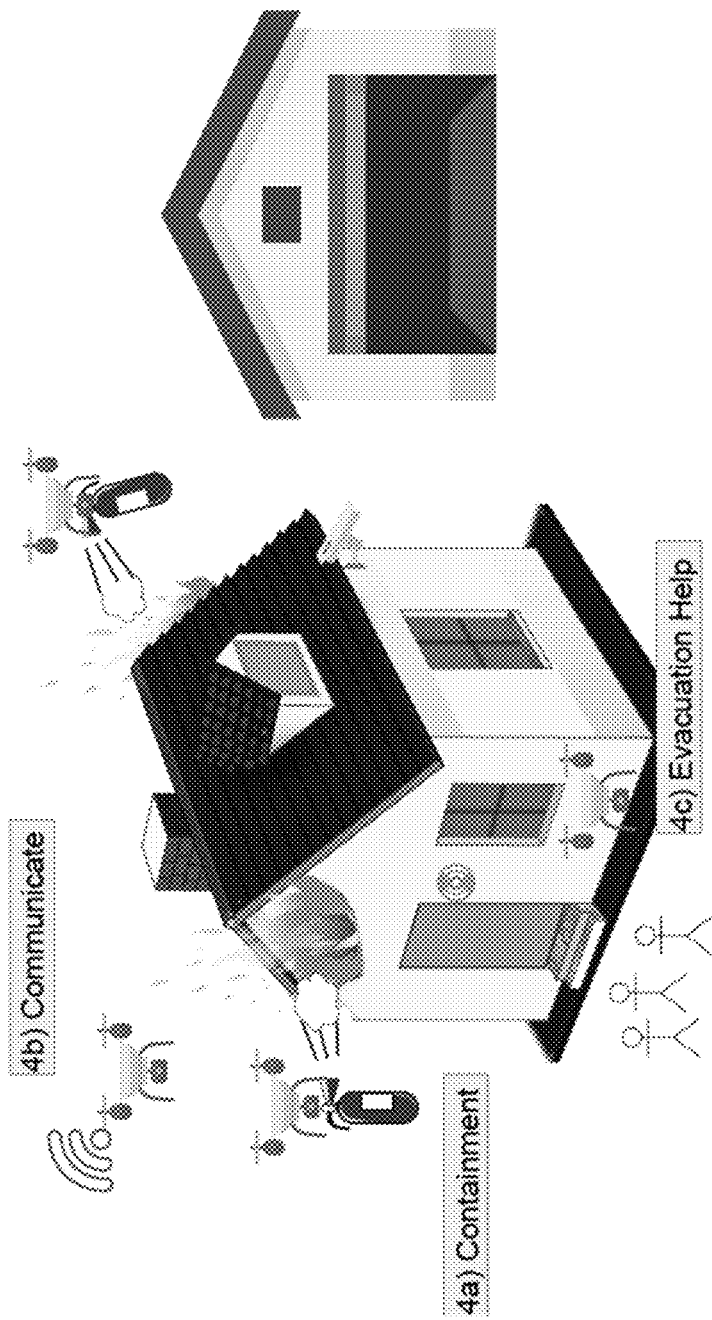
FIG. 12 is an illustration of hybrid mobile units executing a coordinated response, according to one embodiment described herein.

Next, with reference to FIG. 12, shown is an illustration of hybrid mobile units executing a coordinated response. Based on the groups of hybrid mobile units, they are allocated for the remaining tasks, which includes, but is not limited to, initial containment, communicating with first responders, and evacuation/lockdown as shown in FIG. 12. At this point, the threat level increases to level 2 where it can start gathering more information about the situation. Similar to the CCS and control flowchart in the centralized algorithm, the hybrid mobile units can now set the threat level based on the information they receive amongst themselves and the sensor/actuator network.

At threat level 3, the hybrid mobile units can notify the authorities about the threat, sending them the location, as well as type and severity of the threat. Before and when the first responders arrive at the scene, one or more of the hybrid mobile units can keep communicating with them as they help gather information about the threat. At this point, there exists some hybrid mobile units that have been assigned a task due to issues, such as lack of resources at the start and being part of a different infrastructure which was sent to help with the effort. These units can ask a hybrid mobile unit at a location if there is a need for help due to lack of numbers. If this team does not require help, then this new unit can navigate to a different team and check if they need help. Once the situation improves, the threat level can be reset back to zero and can restart the flowchart to START. Otherwise, the threat level elevates to Level 4 where the hybrid mobile units can perform severe actions.

Figure 13:
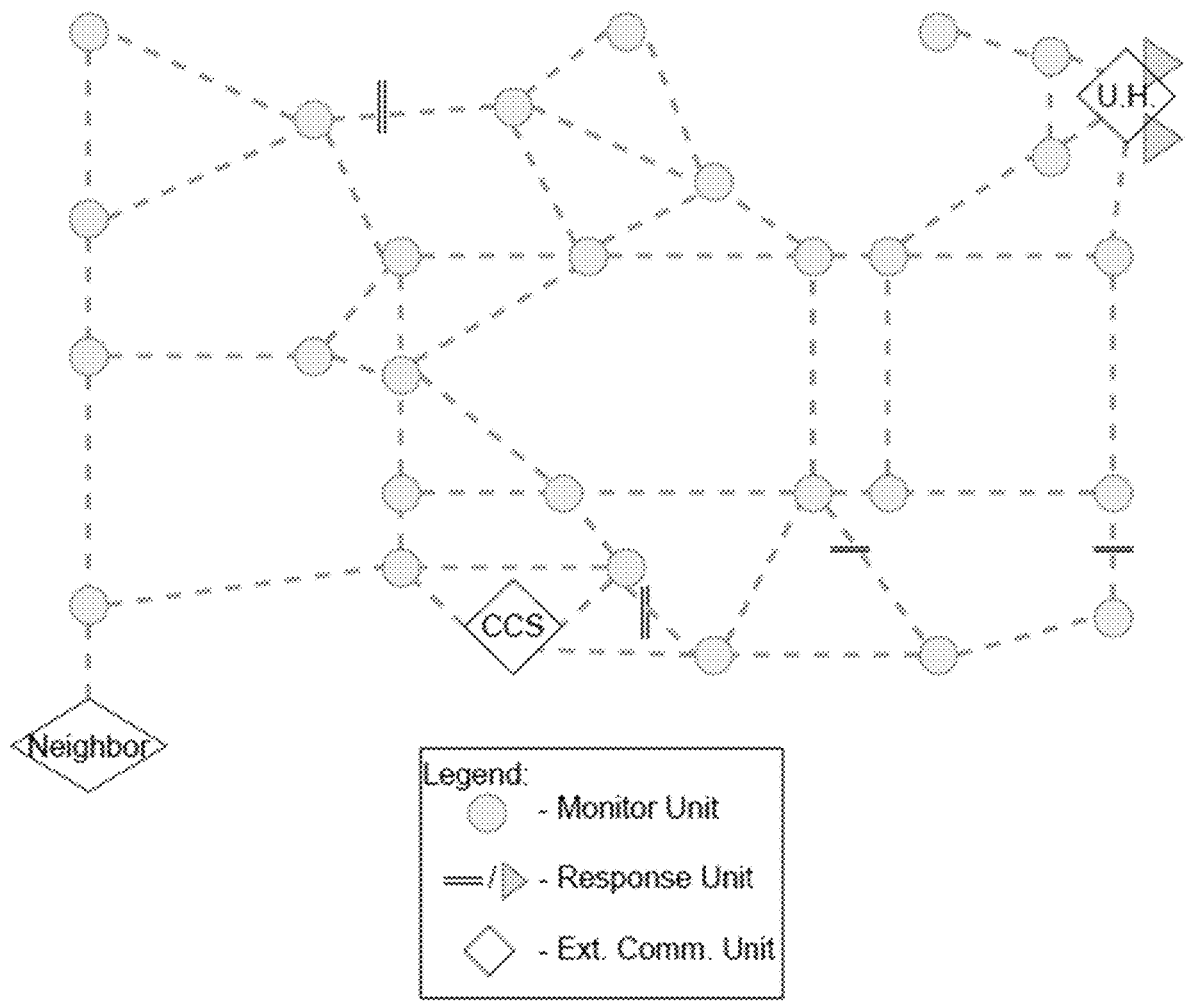
FIG. 13 is an illustration of a graph structure of communication nodes, according to one embodiment described herein.

Moving on to FIG. 13, shown is a graph structure with neighboring CCS and UAV headquarters as communication nodes. Another key objective for the framework's emergency response is the communication with first responders. After the CCS, the monitoring units, and/or the hybrid mobile units confirm the emergency/threat, the CCS reports the threat to the authorities similar to a person calling 911 but with more detailed information about the threat. This includes the type and severity of threat, the current step of the response protocol, the location of the threat, and services needed. Location information includes the coordinates (especially for large buildings), the altitude, building number, floor number, and room number (last three are necessary for a building, not for a car). The position of the sensors, as well as a computer representation of the infrastructure helps to generate this location information quickly. Moreover, using the cameras and microphones on both environmental sensors and hybrid mobile units, the hybrid mobile units can also send a live count of the number of occupants in the danger zone of the threat, especially persons per room. If the threat renders the CCS unavailable, the cooperative algorithm can continue operating, and the device-to-device communication among all the units can keep relaying their information to their neighbors. If there are other computing/communication units available in the infrastructure, it can now take over sending the sensor data to the first responders. Otherwise, if the outside monitoring units have communication with a neighboring infrastructure, it can relay this information securely in order to continue reporting the status of the affected infrastructure. FIG. 13 shows an example graph structure of the framework which includes two other computing/communication nodes: the neighboring infrastructure's CCS and the UAV headquarters. These nodes can grab data from the neighboring monitoring and/or hybrid mobile units to send to the first-responders.

Figure 14:
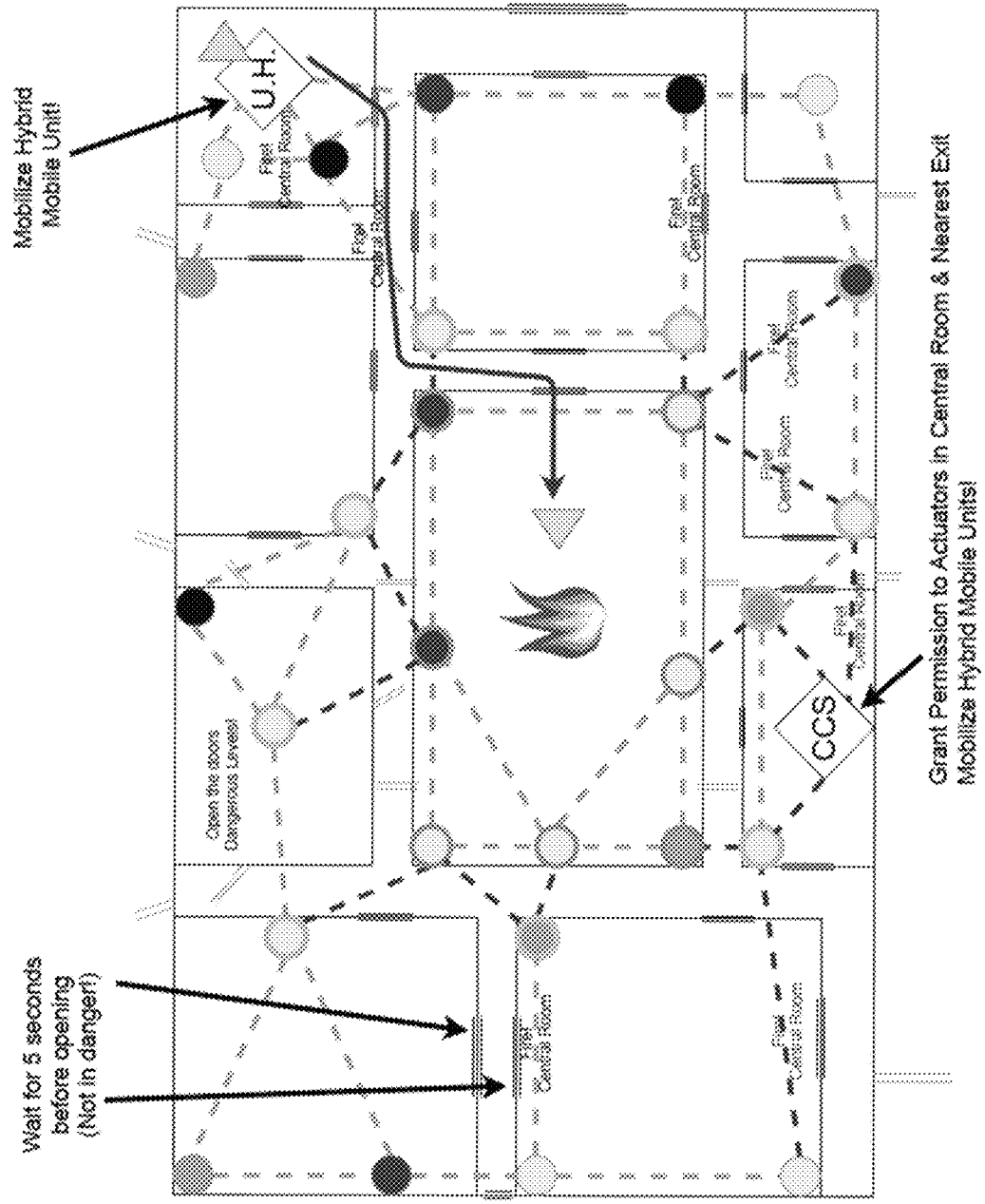
FIG. 14 is an illustration of the interactions of components of the emergency response system in a scenario of a fire event in a building, according to one embodiment described herein.

Referring to FIGS. 14-17, shown are illustrations of various use case emergency scenarios. In FIG. 14, shown is an illustration of the components of the emergency response system in a scenario of a fire event in a building. When the infrastructure (like a building) is on fire, the framework can react to the situation as demonstrated in FIG. 14. This is an extension of FIG. 4 with more information on how most of the units on the system operate during the monitoring and response to the threat. In this scenario, the sensor network can monitor the different sensor modalities for dangerous levels, such as concentrations of combustible gases with gas sensors and visualize signs of flames using ordinary and thermal cameras in the building. After capturing this information, the monitoring unit can send these threats to neighboring units and the CCS. The CCS can decide whether the staged response should be deployed based on its anomaly/threat detection algorithm and model.

In FIG. 14, the building fire is located in the centermost room of the infrastructure. The monitoring units within that room (those with an orange border) detect the fire immediately and send the fire related information to nearby units (those with a yellow border) and the CCS. Even if the monitoring units cannot or are not sending information to the CCS, data about this threat eventually reaches the CCS in a short amount of time. After the CCS receives this data and determines the type and severity of the threat using the anomaly detection algorithm, it can deploy its response unit scheduling algorithm to begin mobilizing the response units. At this point, the actuator response units can have sent requests to the CCS which it can acknowledge as part of the crowd control protocol. At the same time, the CCS can also mobilize the hybrid mobile units to the scene of the fire to confirm its determination.

Figure 15:
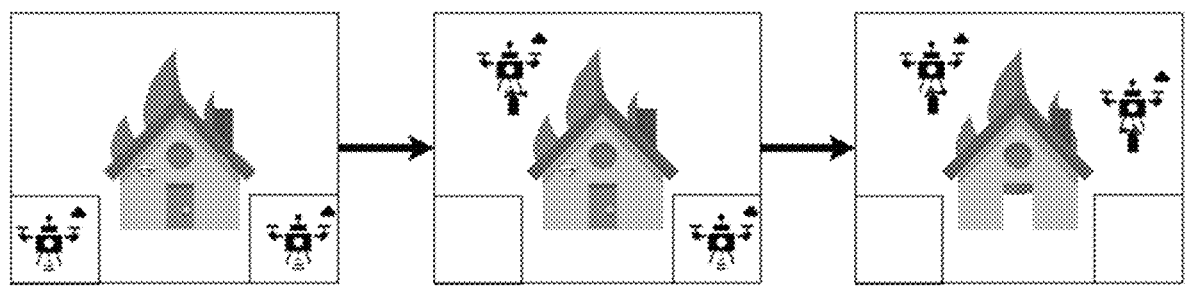
FIG. 15 is an illustration of the deployment of hybrid mobile units in a staged response in a scenario of a fire event in a building, according to one embodiment described herein.

FIG. 15 shows the deployment of hybrid mobile units in a staged response defined by the scheduling algorithm in the CCS for a building on fire. The CCS can also localize where the smoke and flames are within the infrastructure, so it can report this to the authorities. Moreover, these data can better inform firefighters about the severity of the fire and what equipment or personnel are needed as they receive the call about the fire. Moreover, after threat level 2, the system via the CCS or other communication nodes (such as neighboring infrastructure or hybrid mobile units) can send updates to the firefighters en route to the scene, so firefighters can monitor the situation as well. Knowing the location of the fire can help firefighters with figuring out how to approach the location on fire, as well as where to setup their equipment as necessary. As the entities confirm the threat, they can act as the very first firefighters when equipped with flame retardants.

Figure 16:
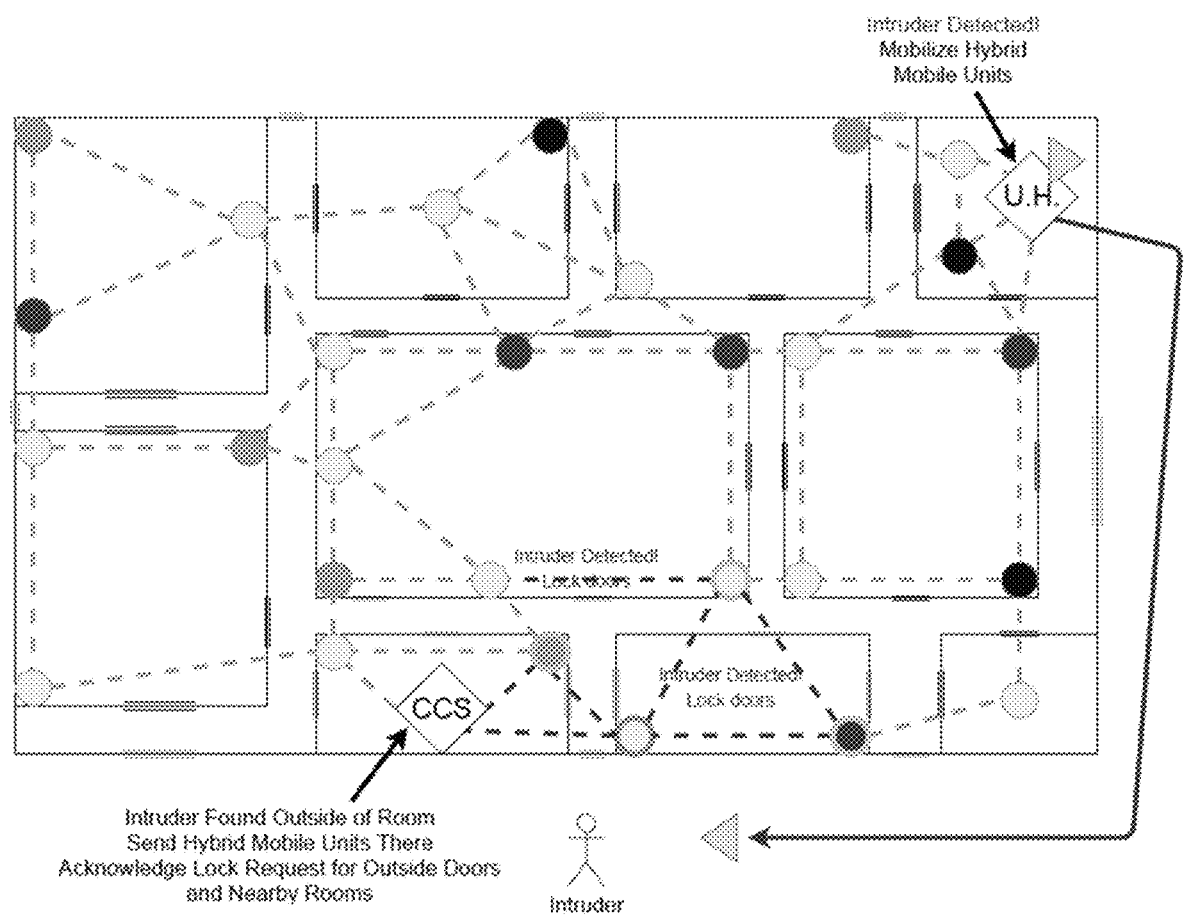
FIG. 16 is an illustration of the interactions of components of the emergency response system in a scenario of a criminal incident event in a building, according to one embodiment described herein.

FIG. 16 illustrates an interaction of the emergency response system for a criminal activity event. When a criminal activity occurs in or around a building, the system can escalate the alertness in the following stages as illustrated in FIG. 16. Examples of criminal activity include illegal trespassing, assault & battery, robbery, and shootings. Just like FIG. 14 for a building on fire, this figure extends FIG. 4 in a scenario where there is criminal activity around the building that has a possibility of also occurring in the building. In this figure, the system can monitor for unusual persons or objects visually as well as for gunshots or screaming voices to determine if a threat arises using the anomaly detection algorithm. The CCS can react according to the determination of this algorithm and deploy the response unit scheduling appropriately. In FIG. 16, the intruder is approaching from the south side of the building through one of the doors there. The monitoring units that are pointed outside (one with the orange border) then detect this person immediately and send an intruder alert to nearby units (those with the yellow border) and the CCS either directly, or through the CCS's neighbors. After detection, the CCS can issue a lockdown alert and acknowledge a lock request of all doors and windows that go out of the building. It can also lock the doors and windows on the rooms closest to the location of the intruder as an extra precaution. At the same time, the intruder alert is propagated throughout the sensor and actuator networks to prepare their crowd control protocol if needed.

Figure 17:
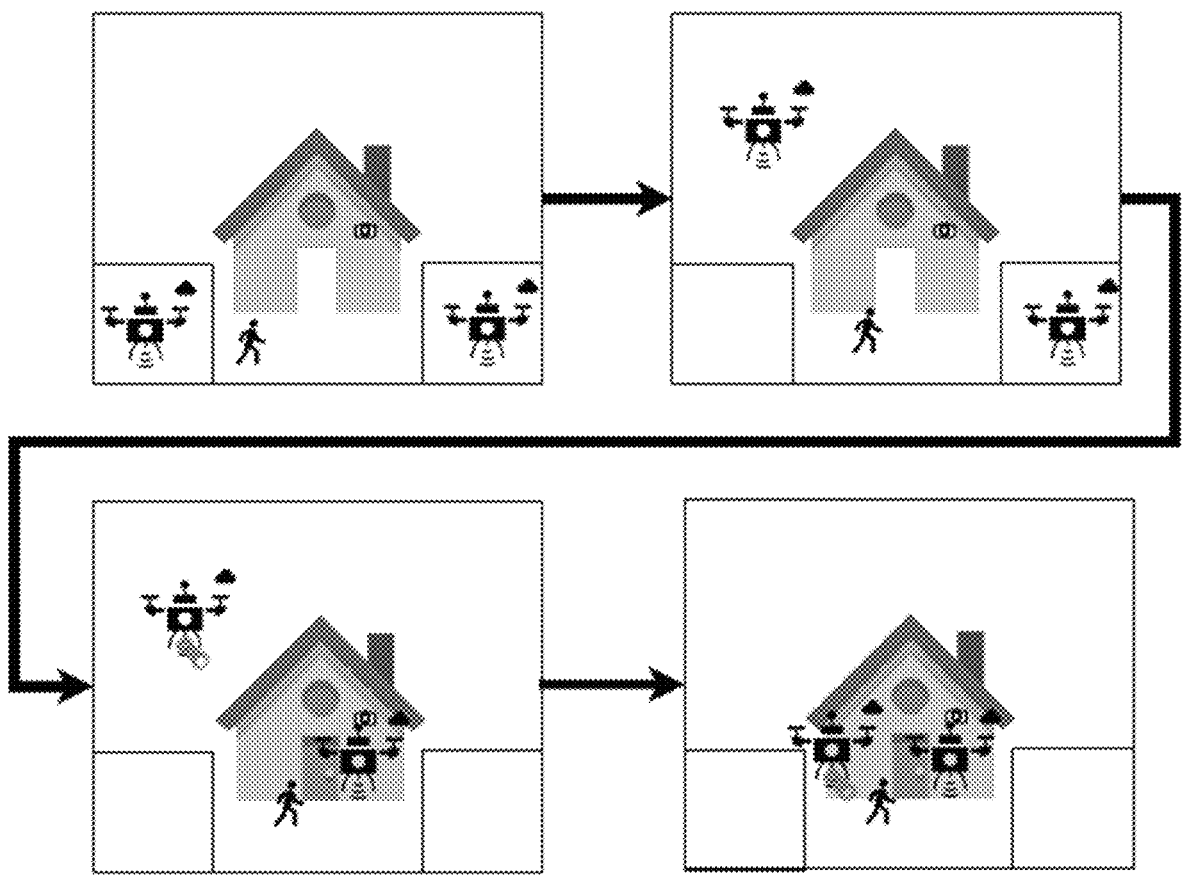
FIG. 17 is an illustration of the deployment of hybrid mobile units in a staged response in a scenario of a criminal incident event in a building, according to one embodiment described herein.

In FIG. 17, shown is a response of the hybrid mobile units on a building under attack. At this point, the CCS can deploy one of the hybrid mobile units as shown in FIG. 17 to confirm the threat and begin containing the situation. After confirming the threat, the CCS can notify the authorities of the intruder and their location around the building. If the intruder flees the scene, the hybrid mobile unit can follow them and continue to communicate the intruder's location to first-responders and cops. Once the intruder has fled or has been arrested, the building can now unlock and let the occupants know the results of the response.

In the present disclosure, infrastructure can refer to place or structure that needs to be monitored and where the entities reside in (e.g., buildings and vehicles). The hybrid mobile unit OR first-responder entities can refer to an autonomous vehicle that can actively move and performs monitoring for and response to emergency situations, such as UAVs and robots. The CCS can refer to a computing module that makes high-level decisions in response to an emergency situation using a staged response.

Figure 18:
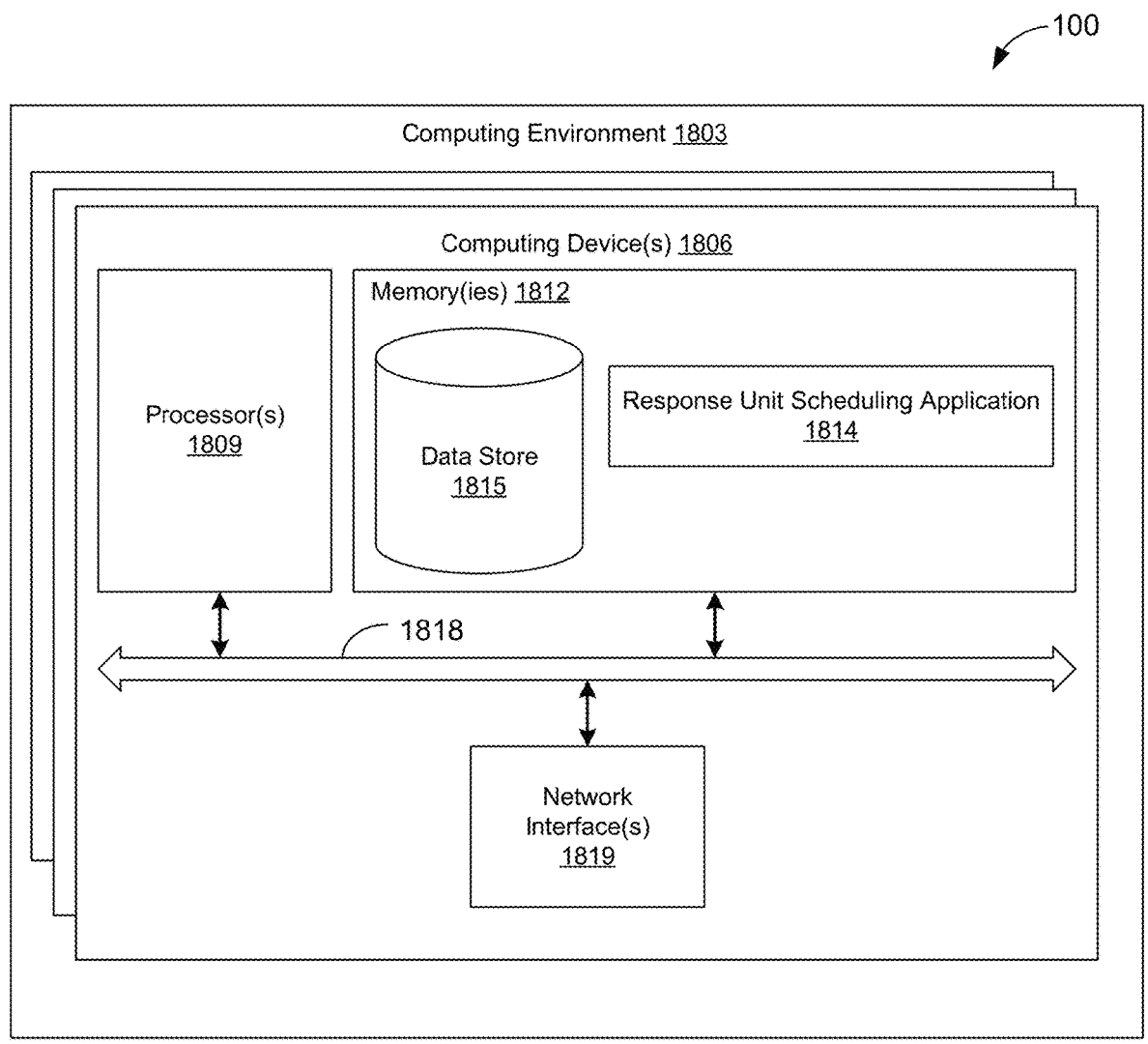
FIG. 18 is a schematic block diagram that provides one example illustration of a computing environment for the central control system, according to one embodiment described herein.

With reference to FIG. 18, shown is a schematic block diagram of the computing environment 1803 for the central control system according to an embodiment of the present disclosure. The computing environment 1803 includes one or more computing devices 1806. Each computing device 1806 includes at least one processor circuit, for example, having a processor 1809 and a memory 1812, both of which are coupled to a local interface 1818. To this end, each computing device 1806 may comprise, for example, at least one server computer or like device. The local interface 1818 may comprise, for example, a data bus with an accompanying address/control bus or other bus structure as can be appreciated. The computing device 1806 can include one or more network interfaces 1819, which can represent wired or wireless communication networks.

Stored in the memory 1812 are both data and several components that are executable by the processor 1809. In particular, stored in the memory 1812 and executable by the processor 1809 are response unit scheduling application 1814 (see e.g., FIG. 5), and potentially other applications. Also stored in the memory 1812 may be a data store 1815 and other data. In addition, an operating system may be stored in the memory 1812 and executable by the processor 1809.

It is understood that there may be other applications that are stored in the memory 1812 and are executable by the processor 1809 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1812 and are executable by the processor 1809. In this respect, the term "executable" means a program file that is in a form that can ultimately be run by the processor 1809. Examples of executable programs may be, for example, a compiled program that can be translated into machine code in a format that can be loaded into a random access portion of the memory 1812 and run by the processor 1809, source code that may be expressed in proper format such as object code that is capable of being loaded into a random access portion of the memory 1812 and executed by the processor 1809, or source code that may be interpreted by another executable program to generate instructions in a random access portion of the memory 1812 to be executed by the processor 1809, etc. An executable program may be stored in any portion or component of the memory 1812 including, for example, random access memory (RAM), read-only memory (ROM), hard drive, solid-state drive, USB flash drive, memory card, optical disc such as compact disc (CD) or digital versatile disc (DVD), or other memory components.

The memory 1812 is defined herein as including both volatile and nonvolatile memory and data storage components. Volatile components are those that do not retain data values upon loss of power. Nonvolatile components are those that retain data upon a loss of power. Thus, the memory 1812 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1809 may represent multiple processors 1809 and/or multiple processor cores and the memory 1812 may represent multiple memories 1812 that operate in parallel processing circuits, respectively. In such a case, the local interface 1818 may be an appropriate network that facilitates communication between any two of the multiple processors 1809, between any processor 1809 and any of the memories 1812, or between any two of the memories 1812, etc. The local interface 1818 may comprise additional systems designed to coordinate this communication, including, for example, performing load balancing. The processor 1809 may be of electrical or of some other available construction.

The flowcharts of FIGS. 5-7, 9 and 10 show the functionality and operation of an implementation of portions of the different applications executed in the central control system, hybrid mobile unit, a response unit, and other suitable units. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1809 in a computer system or other system. The machine code may be converted from the source code, etc. If embodied in hardware, each block may represent a circuit or a number of interconnected circuits to implement the specified logical function(s).

Although the flowcharts of FIGS. 5-7, 9 and 10 show a specific order of execution, it is understood that the order of execution may differ from that which is depicted. For example, the order of execution of two or more blocks may be scrambled relative to the order shown. Also, two or more blocks shown in succession in FIGS. 5-7, 9 and 10 may be executed concurrently or with partial concurrence. Further, in some embodiments, one or more of the blocks shown in FIGS. 5-7, 9 and 10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 1809 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a computing device;
   a memory in communication with the computing device, wherein the memory comprises a plurality of machine instructions that, when executed, cause the computing device to at least:
   generate a sensor network for a building infrastructure based at least in part on communication from a plurality of a monitoring devices, the sensor network indicating a plurality of static device locations for the plurality of monitoring devices related to the building infrastructure, generating the sensor network includes indicating a plurality of neighboring locational relationships between the plurality of monitoring device with respect to building infrastructure;
   receive sensor data from the sensor network of the building infrastructure;
   determine an occurrence of an emergency event at a location in the building infrastructure using an anomaly detector model based at least in part on the sensor data;
   determine an emergency threat type associated with the emergency event based at least in part on the sensor data and an object detection technique;
   instruct a hybrid mobile device to navigate to the location of the emergency event, wherein the hybrid mobile device comprises a second sensor and a clamp, the second sensor providing mobile sensor data associated with the location to confirm the emergency event, the clamp being manipulated by a motor for delivering a payload;
   receive a confirmation of the emergency event from the hybrid mobile device;
   determine a threat level for the emergency event based at least in part on the confirmation and mobile sensor data provided by the hybrid mobile device from the location;
   identify an order of priorities for mitigating the emergency event based at least in part on a first optimization goal having a higher priority than a second optimization goal for mitigating the emergency event;
   select a mitigation action for the emergency event based at least in part on the order of priorities, the emergency threat type, and the threat level; and
   instruct the hybrid mobile device to perform the mitigation action by activating the clamp to deliver the payload at the location of the building infrastructure associated with the emergency event.

2. The system of claim 1, wherein generating the sensor network further comprises generating a graph data structure of the plurality of monitoring devices on the building infrastructure based at least in part on plurality of static device locations of the plurality of monitoring devices, wherein the graph data structure is used by the anomaly detector model to determine the occurrence of the emergency event.

3. The system of claim 1, wherein the hybrid mobile device is an aerial vehicle that comprises at least one of a gas sensor or a camera.

4. The system of claim 1, wherein the confirmation is based at least in part on the mobile sensor data captured by the hybrid mobile device and the plurality of machine instructions that, when executed, cause the computing device to at least:
   transmit emergency information associated with the emergency event to a remote system associated with a first-responder organization, wherein the emergency information comprises at least a portion of the mobile sensor data.

5. The system of claim 1, wherein the confirmation is further based at least in part on the mobile sensor data captured by the hybrid mobile device and the plurality of machine instructions that, when executed, cause the computing device to at least:
   determine to raise a threat level for the emergency event based at least in part on the sensor data and the mobile sensor data.

6. The system of claim 5, wherein the mitigation action for the emergency event is further determined based at least in part on the threat level.

7. The system of claim 5, wherein the plurality of machine instructions that, when executed, cause the computing device to at least:
   receive the mobile sensor data from the hybrid mobile device, wherein the mobile sensor data is associated with the location of the emergency event and captured by an onboard sensor of the hybrid mobile device; and
   determine to lower the threat level for the emergency event based at least in part on the sensor data and the mobile sensor data.

8. The system of claim 1, wherein the emergency event comprises at least one of a fire event associated with the building infrastructure or a criminal event associated with the building infrastructure.

9. The system of claim 1, wherein the anomaly detector model comprises historical sensor data representing a plurality of scenarios of a normal state for the building infrastructure, and determining the occurrence of the emergency event at the location in the building infrastructure further comprises comparing the sensor data associated with the emergency event and the historical sensor data.

10. A method, comprising:
    generating, by a computing device, a sensor network for a building infrastructure based at least in part on communication from a plurality of a monitoring devices, the sensor network indicating a plurality of static device locations for the plurality of a monitoring devices related to the building infrastructure, generating the sensor network includes indicating a plurality of neighboring locational relationships between the plurality of monitoring device with respect to building infrastructure;
    receiving, by the computing device, sensor data from the sensor network;

determining, by the computing device, an occurrence of an emergency event at a location in the building infrastructure using an anomaly detector model based at least in part on the sensor data;

determining, by the computing device, an emergency threat type associated with the emergency event based at least in part on the sensor data and an object detection technique;

instructing, by the computing device, a hybrid mobile device to navigate to the location of the emergency event, wherein the hybrid mobile device is configured to provide mobile sensor data associated with the location to confirm the emergency event;

receiving, by the computing device, a confirmation of the emergency event from the hybrid mobile device;

determining, by the computing device, a threat level for the emergency event based at least in part on the confirmation and the mobile sensor data provided by the hybrid mobile device from the location;

identifying, by the computing device, an order of priorities for mitigating the emergency event based at least in part on a first optimization goal having a higher priority than a second optimization goal for mitigating the emergency event;

determining, by the computing device, a mitigation action for the emergency event based at least in part on the order of priorities, the emergency threat type, and the threat level; and instructing, by the computing device, the hybrid mobile device to perform the mitigation action.

11. The method of claim 10, wherein generating the sensor network further comprises generating a graph data structure of the plurality of monitoring devices on the building infrastructure based at least in part on plurality of static device locations of the plurality of monitoring devices, wherein the graph data structure is used by the anomaly detector model to determine the occurrence of the emergency event.

12. The method of claim 10, wherein the hybrid mobile device comprises at least one of an unmanned aerial vehicle or an autonomous robot.

13. The method of claim 12, wherein instructing the hybrid mobile device to perform the mitigation action further comprises instructing a plurality of hybrid mobile devices to perform a coordinated response associated with the mitigation action.

14. The method of claim 12, wherein the hybrid mobile device is configured to autonomously form a device group with a plurality of hybrid mobile devices for the emergency event based at least in part on a criteria.

15. The method of claim 10, wherein the confirmation is further based at least in part on the mobile sensor data captured by the hybrid mobile device and the method further comprising:

transmitting, by the computing device, emergency information associated with the emergency event to a remote system associated with a first-responder organization, wherein the emergency information comprises at least a portion of the mobile sensor data.

16. The method of claim 10, wherein the confirmation is further based at least in part on the mobile sensor data captured by the hybrid mobile device and the method further comprising:

determining, by the computing device, to raise a threat level for the emergency event based at least in part on the sensor data and the mobile sensor data.

17. A non-transitory, computer-readable medium, comprising machine-readable instructions that, when executed by a processor of a client device, cause the client device to at least:

generate a sensor network for a building infrastructure based at least in part on communication from a plurality of a monitoring devices, the sensor network indicating a plurality of static device locations for the plurality of monitoring devices related to the building infrastructure, generating the sensor network includes indicating a plurality of neighboring locational relationships between the plurality of monitoring device with respect to building infrastructure;

receive sensor data from the sensor network;

determine an occurrence of an emergency event at a location in the building infrastructure using an anomaly detector model based at least in part on the sensor data and a graph data structure representing the plurality of static device locations for the plurality of monitoring devices in the sensor network;

determine an emergency threat type associated with the emergency event based at least in part on the sensor data and an object detection technique;

instruct a hybrid mobile device to navigate to the location of the emergency event, wherein the hybrid mobile device is configured to provide mobile sensor data associated with the location to confirm the emergency event;

receive a confirmation of the emergency event from the hybrid mobile device;

determine a threat level for the emergency event based at least in part on the confirmation and the mobile sensor data provided by the hybrid mobile device from the location;

identify an order of priorities for mitigating the emergency event based at least in part on a first optimization goal having a higher priority than a second optimization goal for mitigating the emergency event;

determine a mitigation action for the emergency event based at least in part on the order of priorities, the emergency threat type, and the threat level; and instruct the hybrid mobile device to perform the mitigation action.

18. The non-transitory, computer-readable medium of claim 17, wherein the emergency threat type associated with the emergency event is further based at least in part on the sensor data and a threshold-based technique.

* * * * *